(12) United States Patent
Higuchi et al.

(10) Patent No.: US 8,281,045 B2
(45) Date of Patent: Oct. 2, 2012

(54) DEVICE CONTROL DEVICE, DEVICE CONTROL METHOD, AND COMPUTER PROGRAM

(75) Inventors: Satoshi Higuchi, Kanagawa (JP); Koichi Tashiro, Tokyo (JP); Ken Onogi, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 12/928,807

(22) Filed: Dec. 20, 2010

(65) Prior Publication Data

US 2011/0157479 A1   Jun. 30, 2011

(30) Foreign Application Priority Data

Dec. 28, 2009   (JP) ................. P2009-298947

(51) Int. Cl.
*G06F 3/00* (2006.01)
*G06F 13/00* (2006.01)
(52) U.S. Cl. ............ 710/8; 710/5; 710/33; 710/36
(58) Field of Classification Search .............. None
See application file for complete search history.

(56) References Cited

U.S. PATENT DOCUMENTS

| | | | |
|---|---|---|---|
| 2009/0106444 A1* | 4/2009 | Agnihotri et al. ............ | 709/233 |
| 2009/0147137 A1* | 6/2009 | Bae et al. .................... | 348/554 |
| 2010/0030868 A1 | 2/2010 | Okamoto et al. | |
| 2010/0107208 A1 | 4/2010 | Okamoto et al. | |

FOREIGN PATENT DOCUMENTS

| | | |
|---|---|---|
| EP | 1744542 A1 | 1/2007 |
| EP | 1942657 A1 | 7/2008 |
| EP | 2109045 A1 | 10/2009 |
| EP | 2111041 A1 | 10/2009 |
| JP | 2008-035399 A | 2/2008 |
| WO | WO-2008/093780 A1 | 8/2008 |

OTHER PUBLICATIONS

MB91 F313 HDMI-CEC, Mar. 7, 2007, Fujitsu, [online, accessed on Jan. 28, 2012], URL: http://edevice.fujitsu.com/fj/aplnote/en-pdf/AN07-00154-1E.pdf.*
European Search Report EP 10188425, dated Mar. 31, 2011.

* cited by examiner

*Primary Examiner* — Scott Sun
(74) *Attorney, Agent, or Firm* — Lerner, David, Littenberg, Krumholz & Mentlik, LLP

(57) ABSTRACT

A device control device includes a transmission signal receiving/outputting unit configured to receive/output a signal containing a control signal for controlling an internal status from/to another device, the other device being connected to the transmission signal receiving/outputting unit, an application obtaining unit configured to obtain an application as necessary by accessing an application server via a network, a display control unit configured to control display based on the application obtained by the application obtaining unit, and an operation control unit configured to control an operation of the other device by performing the application obtained by the application obtaining unit. The display control unit changes content to be displayed in accordance with a type of the other device.

14 Claims, 32 Drawing Sheets

FIG. 2

| ADDRESS | DEVICE |
|---|---|
| 0 | TV |
| 1 | RECORDING DEVICE 1 |
| 2 | RECORDING DEVICE 2 |
| 3 | TUNER 1 |
| 4 | PLAYBACK DEVICE 1 |
| 5 | AUDIO SYSTEM |
| 6 | TUNER 2 |
| 7 | TUNER 3 |
| 8 | PLAYBACK DEVICE 2 |
| 9 | RECORDING DEVICE 3 |
| 10 | TUNER 4 |
| 11 | PLAYBACK DEVICE 3 |
| 12 | RESERVED |
| 13 | RESERVED |
| 14 | FREE USE |
| 15 | UNREGISTERED (AS INITIATOR ADDRESS) BROADCAST (AS DESTINATION ADDRESS) |

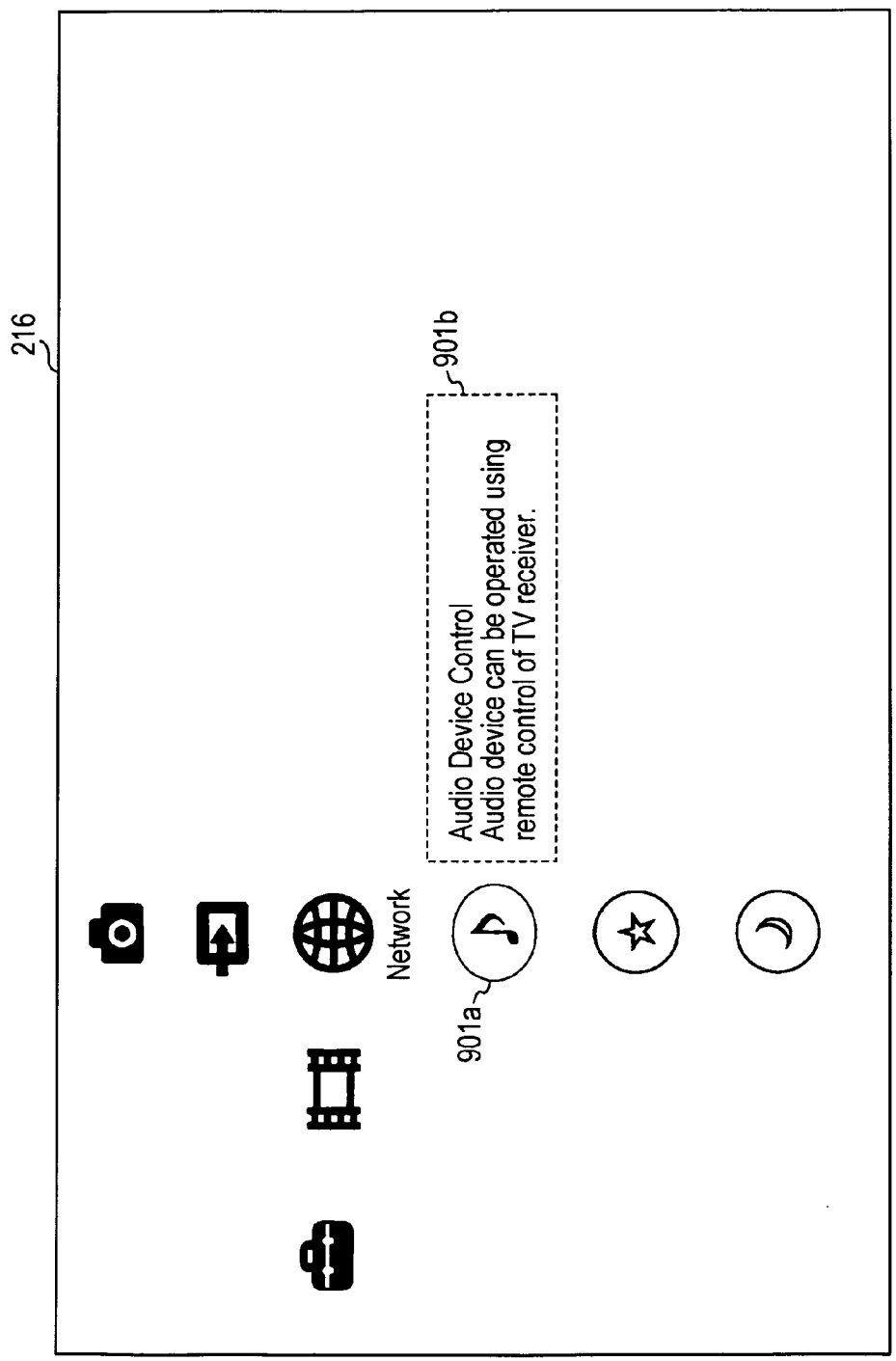

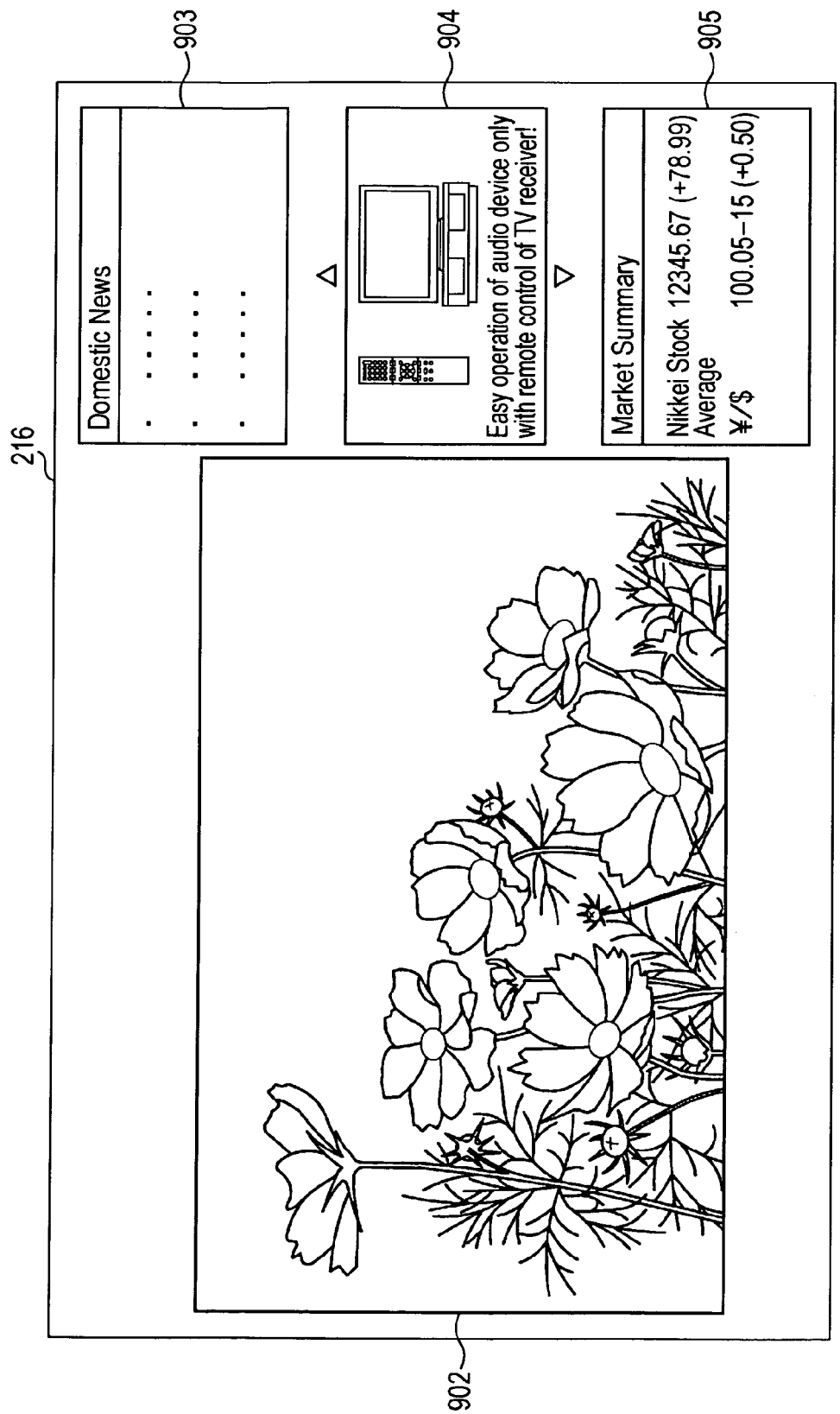

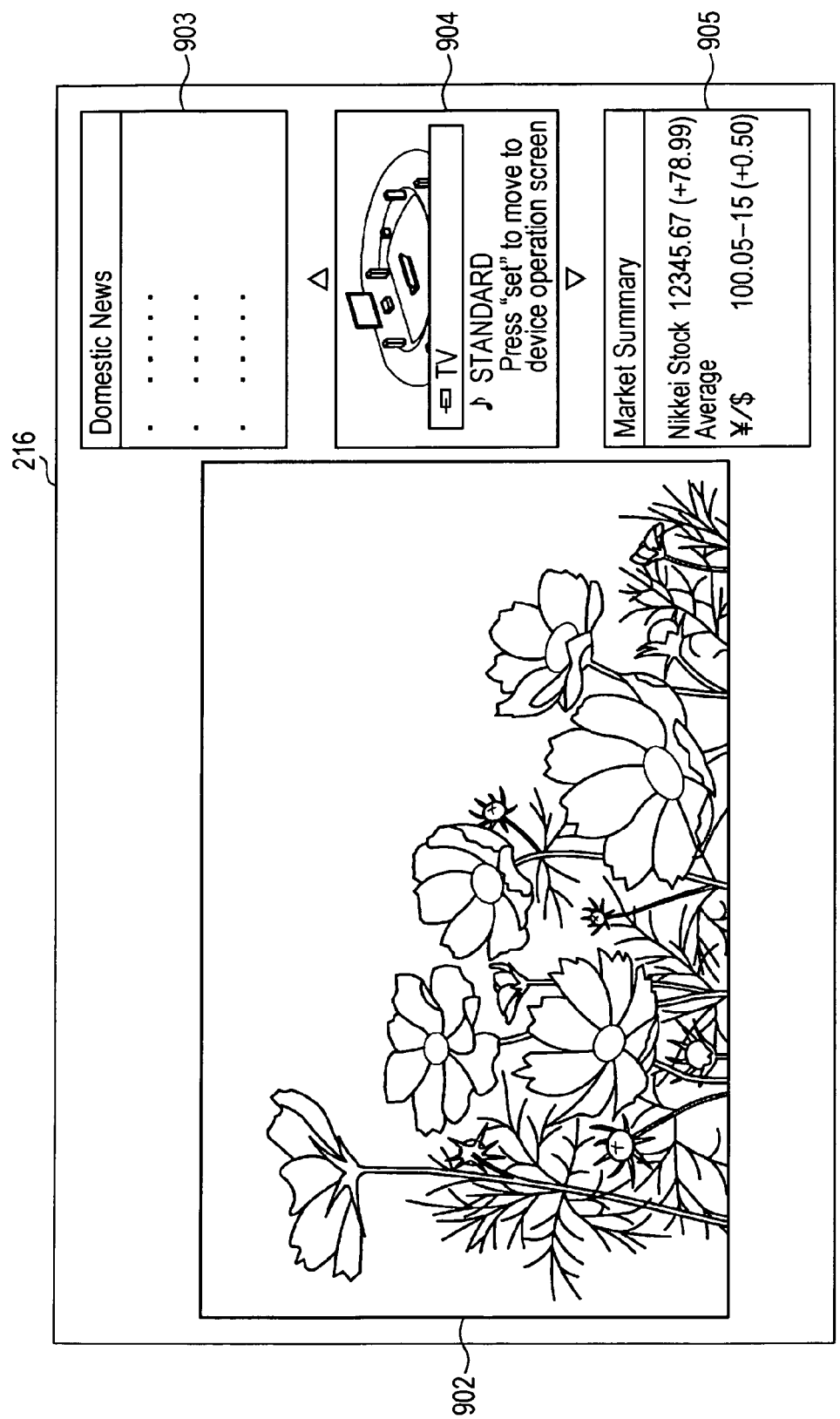

FIG. 34

| TYPE OF COMMAND | OPECODE | EIGHTH BYTE | NINTH BYTE | TENTH BYTE |
|---|---|---|---|---|
| REQUEST FOR STATUS FROM TV TO AMPLIFIER | 0x0000 | – | – | – |
| NOTIFICATION OF STATUS FROM AMPLIFIER TO TV | 0x0001 | CENTER LEVEL | SUBWOOFER LEVEL | FRONT L LEVEL |
| SETTING COMMAND FROM TV TO AMPLIFIER | 0x0002 | CENTER LEVEL | SUBWOOFER LEVEL | FRONT L LEVEL |

| TYPE OF COMMAND | ELEVENTH BYTE | TWELFTH BYTE | THIRTEENTH BYTE |
|---|---|---|---|
| REQUEST FOR STATUS FROM TV TO AMPLIFIER | – | – | – |
| NOTIFICATION OF STATUS FROM AMPLIFIER TO TV | FRONT R LEVEL | SURR LCH LEVEL | SURR RCH LEVEL |
| SETTING COMMAND FROM TV TO AMPLIFIER | FRONT R LEVEL | SURR LCH LEVEL | SURR RCH LEVEL |

| TYPE OF COMMAND | FOURTEENTH BYTE | FIFTEENTH BYTE | SIXTEENTH BYTE |
|---|---|---|---|
| REQUEST FOR STATUS FROM TV TO AMPLIFIER | – | – | – |
| NOTIFICATION OF STATUS FROM AMPLIFIER TO TV | – | – | – |
| SETTING COMMAND FROM TV TO AMPLIFIER | – | – | – |

FIG. 35

| TYPE OF COMMAND | OPECODE | EIGHTH BYTE | NINTH BYTE | TENTH BYTE |
|---|---|---|---|---|
| REQUEST FOR STATUS FROM TV TO AMPLIFIER | 0x0003 | — | — | — |
| NOTIFICATION OF STATUS FROM AMPLIFIER TO TV | 0x0004 | SET VALUE A | SET VALUE B | SET VALUE C |
| SETTING COMMAND FROM TV TO AMPLIFIER | 0x0005 | SET VALUE A | SET VALUE B | SET VALUE C |

| TYPE OF COMMAND | ELEVENTH BYTE | TWELFTH BYTE | THIRTEENTH BYTE |
|---|---|---|---|
| REQUEST FOR STATUS FROM TV TO AMPLIFIER | — | — | — |
| NOTIFICATION OF STATUS FROM AMPLIFIER TO TV | — | — | — |
| SETTING COMMAND FROM TV TO AMPLIFIER | — | — | — |

| TYPE OF COMMAND | FOURTEENTH BYTE | FIFTEENTH BYTE | SIXTEENTH BYTE |
|---|---|---|---|
| REQUEST FOR STATUS FROM TV TO AMPLIFIER | — | — | — |
| NOTIFICATION OF STATUS FROM AMPLIFIER TO TV | — | — | — |
| SETTING COMMAND FROM TV TO AMPLIFIER | — | — | — |

DEVICE CONTROL DEVICE, DEVICE CONTROL METHOD, AND COMPUTER PROGRAM

CROSS-REFERENCE TO RELATED APPLICATION

The present application claims priority from Japanese Patent Application No. JP 2009-298947 filed in the Japanese Patent Office on Dec. 28, 2009, the entire content of which is incorporated herein by reference.

BACKGROUND OF THE INVENTION

1. Field of the Invention

The present invention relates to a device control device, a device control method, and a computer program. More specifically, the present invention relates to a device control device, a device control method, and a computer program that control an operation unique to another device by using a digital interface for transmitting signals.

2. Description of the Related Art

A high-definition multimedia interface (HDMI) has been widespread as a digital interface for transmitting video (image) signals and audio signals. The HDMI is based on a digital visual interface (DVI) standard, which is a standard for connection between a personal computer (PC) and a display, and is arranged for audio visual (AV) devices by adding an audio transmission function and a copyright protection function. High-Definition Multimedia Interface Specification Version 1.4 describes the details of the HDMI standard.

The interface based on the HDMI standard is capable of performing bidirectional transmission of a control signal, and is thus capable of transmitting a control signal from a television receiver to an output device, such as a set top box (STB) or a video disc player, connected via an HDMI cable. With such transmission of a control signal from a television receiver, a user can operate an entire AV system using a remote control of the television receiver. Examples of the signal transmitted through a transmission cable of the HDMI standard include a control instruction for controlling a device, a response to the instruction, and a signal representing a status of a device. In this specification, those signals are collectively referred to as control signals.

In the HDMI standard, interdevice control using consumer electronics control (CEC) is defined. The CEC is a single transmission line provided in the HDMI standard and performs bidirectional data transmission. By using the CEC line, various controls can be performed on the basis of unique physical addresses and logical addresses assigned to individual devices existing on an HDMI network. For example, if a video disc player connected to a television receiver via an HDMI cable is operated while a user is watching and listening to digital broadcast on the television receiver, the television receiver automatically switches the input to that of the video disc player. Also, a menu displayed by the video disc player and on/off of the power can be operated from a remote control of the television receiver.

According to the HDMI standard, a maximum of ten devices, including a television receiver, can be connected. Thus, a maximum of nine external devices can be connected to one television receiver. If the number of external devices connected to the television receiver is nine, any of the devices can be operated from a remote control.

In the HDMI standard, "Active Source" is defined as a CEC message for indicating a device that is displaying an image in the television receiver. According to this definition, for example, when a user operates a play button of a video disc player compatible with the HDMI standard, the video disc player outputs an AV stream if the video disc player is in a status capable of outputting a stable video signal (that is, in an active status). Also, the video disc player broadcasts an "Active Source" message indicating that the video disc player is an active device.

Here, "broadcast" means simultaneous transmission of a signal to all devices, not to a specific device. The television receiver and the other external devices that have received the "Active Source" message switch paths in order to play back the AV stream output from the video disc player.

As described above, in the HDMI standard, it is defined that the device that starts displaying video in the television receiver broadcasts an "Active Source" message to the other devices in the network. Note that the "Active Source" message is one of CEC messages defined in the HDMI standard.

Also, as described in Japanese Unexamined Patent Application Publication No. 2008-35399, for example, a function of changing a playback sound field in accordance with genre information of an electronic program guide (EPG) as electronic program information obtained in the television receiver has been realized as the control based on HDMI-CEC. In this function, genre information of the EPG is output to an HDMI-CEC line at the start of receiving a program that is watched/listened to in the television receiver or at the change of a program. The genre information provided through the CEC line is received by an audio playback device, such as an AV amplifier, whereby a playback sound field is set in accordance with the genre information.

For example, when a user wants to watch/listen to a sport program, the user can set a playback mode for obtaining a realistic sensation of the sport program. When a user wants to watch/listen to a news program, the user can set a playback mode for easily listening to sound (speech).

SUMMARY OF THE INVENTION

As described above, by connecting a television receiver and an audio playback device, such as an AV amplifier, via a cable of the HDMI standard, a playback sound field can be set in accordance with the genre of AV content to be watched/listened to.

By connecting a television receiver and an audio playback device, such as an AV amplifier, via a cable of the HDMI standard, volume adjustment of the audio playback device and simultaneous power off of the television receiver and the audio playback device can be realized using the remote control of the television receiver. However, manual switching of the playback sound field of the AV amplifier is not performed using the remote control of the television receiver while seeing an operation screen of the television receiver. As a method for changing the sound field of an AV amplifier using a remote control of a television receiver, a method for transmitting a user control pressed command, which is a CEC message, from the television receiver to the AV amplifier, or a method for outputting code for the AV amplifier to the remote control of the television receiver may be used. When such methods are used, it is necessary for a user to check a setting status by seeing information displayed on a fluorescent display tube of the AV amplifier and to operate the AV amplifier on the basis of the information, which is not user-friendly. If such methods are not used, it is necessary for the user to perform operation using the remote control of the AV amplifier every time when the user wants to change the sound field of the AV amplifier. Furthermore, it is necessary for the user to perform the operation while seeing the information displayed on the fluorescent display tube of the AV amplifier, not on the screen of the television receiver. In addition, change of an output level or woofer level of each speaker and other various settings unique to the AV amplifier are not performed through operations on the screen of the television receiver.

As a method for performing various operations on the AV amplifier using the screen of the television receiver, the following method may be used. That is, a graphical user interface (GUI) chip is mounted in the AV amplifier, and a screen for performing various operations on the AV amplifier is output from the AV amplifier to the television receiver using HDMI output. In this method, however, since the GUI chip is mounted in the AV amplifier, the cost of hardware increases. Furthermore, although a GUI can be superimposed on an HDMI output signal, it is difficult to superimpose the GUI on a television method. Therefore, this method does not enable a user to operate the AV amplifier while seeing video, which is inefficient.

Accordingly, it is desirable to provide a new and improved device control device, device control method, and computer program that are capable of appropriately obtaining an application for controlling an operation unique to another device from a server by using a digital interface for transmitting signals and controlling the unique operation by using the application.

According to an embodiment of the present invention, there is provided a device control device including a transmission signal receiving/outputting unit configured to receive/output a signal containing a control signal for controlling an internal status from/to another device, the other device being connected to the transmission signal receiving/outputting unit, an application obtaining unit configured to obtain an application as necessary by accessing an application server via a network, a display control unit configured to control display based on the application obtained by the application obtaining unit, and an operation control unit configured to control an operation of the other device by performing the application obtained by the application obtaining unit. The display control unit changes content to be displayed in accordance with a type of the other device.

The operation control unit may set a plurality of parameters of the other device through a single transmission of a command.

The command transmitted by the operation control unit may be a vendor-specific command based on HDMI-CEC.

The operation control unit may set a real number to a corresponding field of the command in the case of changing a parameter of the other device, and may set a predetermined ineffective value to the corresponding field of the command in the case of not changing the parameter.

The operation control unit may turn off a power of the other device by performing the application obtained by the application obtaining unit.

The other device may be an audio amplifier device. The operation control unit may change a sound field of the audio amplifier device by performing the application obtained by the application obtaining unit.

The other device may be an audio amplifier device. One or more speakers may be connected to the audio amplifier device. The operation control unit may change an audio output level of the one or more speakers connected to the audio amplifier device by performing the application obtained by the application obtaining unit.

The other device may be an audio amplifier device. The operation control unit may change an audio input source of the audio amplifier device by performing the application obtained by the application obtaining unit.

The device control device may further include an application discarding unit configured to discard the application obtained by the application obtaining unit after the operation control unit has ended performance of the application.

According to another embodiment of the present invention, there is provided a device control method including the steps of receiving/outputting a signal containing a control signal for controlling an internal status from/to another device, obtaining an application as necessary by accessing an application server via a network, controlling display based on the obtained application, and controlling an operation of the other device by performing the obtained application. Content to be displayed is changed in accordance with a type of the other device in the controlling display.

According to another embodiment of the present invention, there is provided a computer program that causes a computer to execute the steps of receiving/outputting a signal containing a control signal for controlling an internal status from/to another device, obtaining an application as necessary by accessing an application server via a network, controlling display based on the obtained application, and controlling an operation of the other device by performing the obtained application. Content to be displayed is changed in accordance with a type of the other device in the controlling display.

As described above, according to the embodiments of the present invention, there are provided a new and improved device control device, device control method, and computer program that are capable of appropriately obtaining an application for controlling an operation unique to another device from a server by using a digital interface for transmitting signals and controlling the unique operation by using the application.

BRIEF DESCRIPTION OF THE DRAWINGS

FIG. 2 is a diagram illustrating a CEC table showing the correspondence between devices and CEC logical addresses;

FIG. 11 is an explanatory view illustrating an example of an initial screen displayed on the display panel;

FIG. 12 is an explanatory view illustrating an example of a screen displayed on the display panel;

FIG. 13 is an explanatory view illustrating an example of a screen displayed on the display panel;

FIG. 34 is a diagram illustrating data examples of commands; and

FIG. 35 is a diagram illustrating data examples of commands.

DESCRIPTION OF THE PREFERRED EMBODIMENTS

Figure 1:
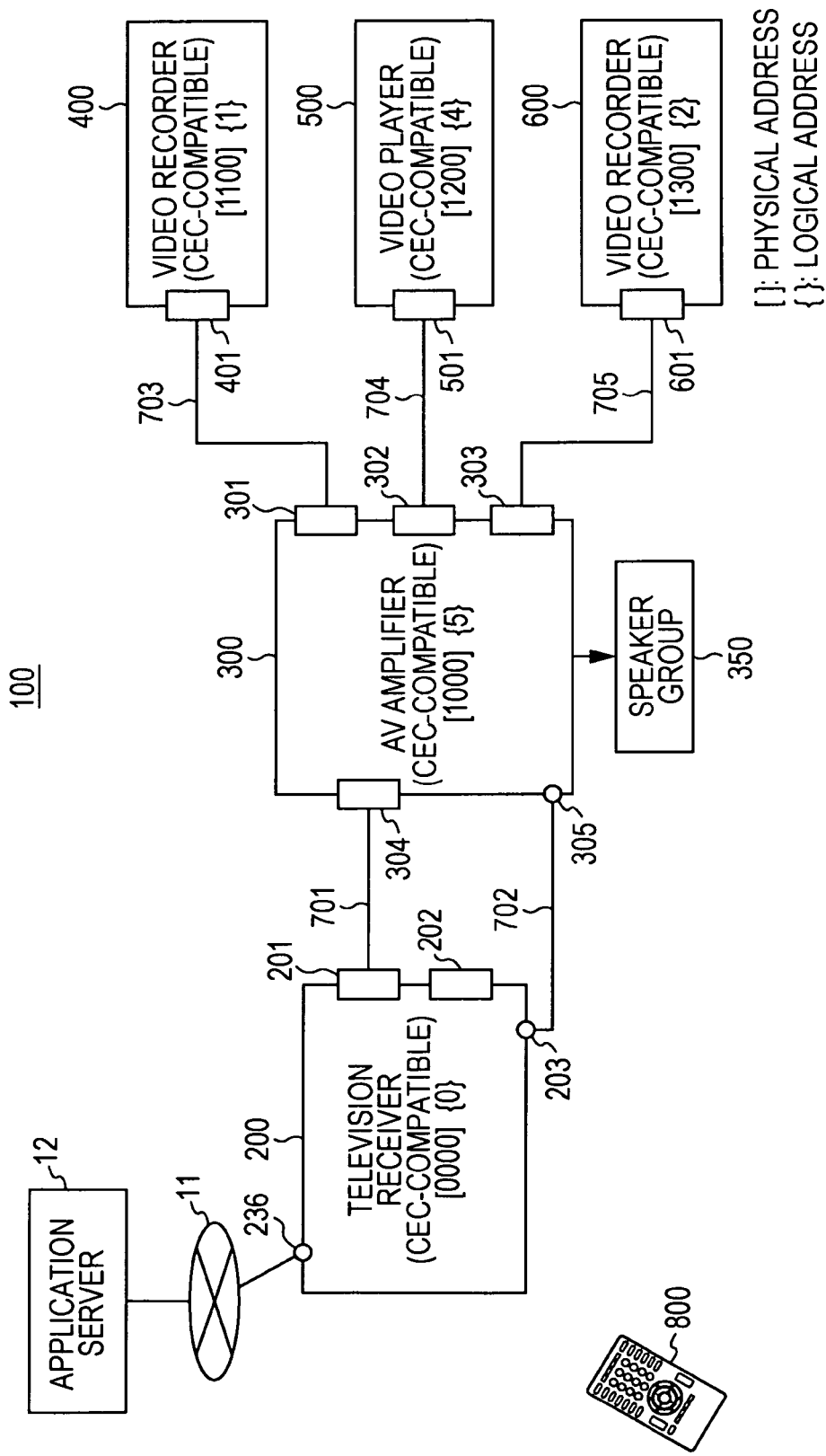
FIG. 1 is a block diagram illustrating a configuration example of an AV system according to an embodiment of the present invention.

Hereinafter, embodiments of the present invention will be described in detail with reference to the attached drawings. In the specification and drawings, elements that have substantially the same functional configurations are denoted by the same reference numerals, and the corresponding description will be omitted.

The description will be given in the following order.
1. Configuration example of entire system (FIGS. 1 and 2)
2. Configuration example of television receiver (FIGS. 3 and 4)
3. Configuration example of AV amplifier (FIG. 5)
4. Configuration example of application server (FIG. 6)
5. Example of transmission configuration and processing of HDMI standard (FIGS. 7 to 9)
6. Operation examples of television receiver and AV amplifier (FIGS. 10 to 35)
7. Conclusion 1. Configuration Example of Entire System (FIGS. 1 and 2)

Hereinafter, an embodiment of the present invention will be described.

FIG. 1 illustrates a configuration example of an AV system 100 according to the embodiment.

The AV system 100 includes a television receiver 200, an AV amplifier 300, a video recorder 400, a video player 500, and a video recorder 600. The video recorder 400, the video player 500, and the video recorder 600 serve as HDMI source devices. The AV amplifier 300 serves as an HDMI repeater device. The television receiver 200 servers as an HDMI sink device. The video recorder 400, the video player 500, and the video recorder 600 are devices that record or play back video data (AV content) by using a recording medium, such as a video disc including a digital versatile disc (DVD) or a hard disk.

The television receiver 200 is a CEC-compatible device and includes HDMI terminals 201 and 202, a light output terminal 203, and a network terminal 236. The television receiver 200 can be remotely controlled by a remote control 800. The television receiver 200 has functions of obtaining an application managed by an application server 12 via a network 11 as necessary and performing a process based on the application, thereby displaying predetermined information and controlling devices connected to the television receiver 200 via the HDMI terminals 201 and 202.

The application provided from the application server 12 is created so as to be executable in a state where video is displayed on the television receiver 200. The user of the television receiver 200 can cause the television receiver 200 to perform an application provided from the application server 12 and use content provided through the application, while watching/listening to a broadcasted program received by the television receiver 200 or content that is played back by the video player 500.

The video recorder 400 includes an HDMI terminal 401, the video player 500 includes an HDMI terminal 501, and the video recorder 600 includes an HDMI terminal 601. Each of those devices is a CEC-compatible device.

The AV amplifier 300 is a CEC-compatible device and includes HDMI terminals 301, 302, 303, and 304 and a light input terminal 305. A speaker group 350 including a plurality of speakers is connected to the AV amplifier 300, so that audio signals that are processed to be played back by the AV amplifier 300 are output from the speaker group 350. The speaker group 350 includes speakers placed on the front, front-right, front-left, rear-right, and rear-left of a listener and a subwoofer speaker for outputting bass, that realize 5.1-channel surround, for example. The AV amplifier 300 may be separated from the speakers. Alternatively, the AV amplifier 300 and the speakers (at least the front speaker) may be accommodated in a rack in which the television receiver 200 is placed.

The television receiver 200 and the AV amplifier 300 are mutually connected via an HDMI cable 701 an optical cable 702. Specifically, one end of the HDMI cable 701 is connected to the HDMI terminal 201 of the television receiver 200, and the other end thereof is connected to the HDMI terminal 304 of the AV amplifier 300. Also, one end of the optical cable 702 is connected to the light output terminal 203 of the television receiver 200, and the other end thereof is connected to the light input terminal 305 of the AV amplifier 300.

The AV amplifier 300 and the video recorder 400 are mutually connected via an HDMI cable 703. Specifically, one end of the HDMI cable 703 is connected to the HDMI terminal 301 of the AV amplifier 300, and the other end thereof is connected to the HDMI terminal 401 of the video recorder 400.

The AV amplifier 300 and the video player 500 are mutually connected via an HDMI cable 704. Specifically, one end of the HDMI cable 704 is connected to the HDMI terminal 302 of the AV amplifier 300, and the other end thereof is connected to the HDMI terminal 501 of the video player 500.

The AV amplifier 300 and the video recorder 600 are mutually connected via an HDMI cable 705. Specifically, one end of the HDMI cable 705 is connected to the HDMI terminal 303 of the AV amplifier 300, and the other end thereof is connected to the HDMI terminal 601 of the video recorder 600.

In the AV system 100 illustrated in FIG. 1, physical addresses and CEC logical addresses of the individual devices are obtained in the following manner.

That is, when the AV amplifier 300 is connected to the television receiver 200 (physical address is [0000] and CEC logical address is {0}) via the HDMI cable 701, the AV amplifier 300 obtains a physical address [1000] from the television receiver 200 by using an HDMI control protocol.

A CEC-compatible device is defined to obtain a logical address when HDMI connection is established. The CEC-compatible device transmits/receives a message by using the logical address. FIG. 2 illustrates a table showing the correspondence between devices and CEC logical addresses. "TV" in the device field is a device for displaying video, such as a television receiver or a projector. "Recording Device" in the device field is a recording device, such as a hard disk recorder or a DVD recorder. "Tuner" in the device field is a device that receives AV content, such as a set top box (STB) that receives cable television. "Playback Device" in the device field is a playback device, such as a video player or a camcorder. "Audio System" in the device field is an audio processing device, such as an AV amplifier.

As described above, the AV amplifier 300 is a CEC-compatible device. On the basis of the table illustrated in FIG. 2, the AV amplifier 300 determines the logical address {5} corresponding to "Audio System". In this case, the AV amplifier 300 recognizes that no other devices have the logical address {5} by using a polling message of a CEC control protocol, and then determines the logical address {5} as its own logical address. Then, the AV amplifier 300 notifies the television receiver 200 that the physical address [1000] corresponds to the CEC-compatible device {5} by using a report physical address of the CEC control protocol.

When the video recorder 400 is connected to the AV amplifier 300 via the HDMI cable 703, the video recorder 400 obtains a physical address [1100] from the AV amplifier 300 by using the HDMI control protocol.

As described above, the video recorder 400 is a CEC-compatible device. On the basis of the table illustrated in FIG. 2, the video recorder 400 determines the logical address {1} corresponding to "Recording Device". In this case, the video recorder 400 recognizes that no other devices have the logical address {1} by using a polling message of the CEC control protocol, and then determines the logical address {1} as its own logical address. Then, the video recorder 400 notifies the television receiver 200 and the AV amplifier 300 that the physical address [1100] corresponds to the CEC-compatible device {1} by using a report physical address of the CEC control protocol.

When the video player 500 is connected to the AV amplifier 300 via the HDMI cable 704, the video player 500 obtains a physical address [1200] from the AV amplifier 300 by using the HDMI control protocol.

As described above, the video player 500 is a CEC-compatible device. On the basis of the table illustrated in FIG. 2, the video player 500 determines the logical address {4} corresponding to "Playback Device". In this case, the video player 500 recognizes that no other devices have the logical address {4} by using a polling message of the CEC control protocol, and then determines the logical address {4} as its own logical address. Then, the video player 500 notifies the television receiver 200 and the AV amplifier 300 that the physical address [1200] corresponds to the CEC-compatible device {4} by using a report physical address of the CEC control protocol.

When the video recorder 600 is connected to the AV amplifier 300 via the HDMI cable 705, the video recorder 600 obtains a physical address [1300] from the AV amplifier 300 by using the HDMI control protocol.

As described above, the video recorder 600 is a CEC-compatible device. On the basis of the table illustrated in FIG. 2, the video recorder 600 determines the logical address {2} corresponding to "Recording Device". In this case, the video recorder 600 recognizes that no other devices have the logical address {2} by using a polling message of the CEC control protocol, and then determines the logical address {2} as its own logical address. Then, the video recorder 600 notifies the television receiver 200 and the AV amplifier 300 that the physical address [1300] corresponds to the CEC-compatible device {2} by using a report physical address of the CEC control protocol.

In the AV system 100 illustrated in FIG. 1, the following operation is performed when a user watches/listens to a program selected by a tuner of the television receiver 200. That is, an image based on a video signal obtained by the tuner is displayed on a display panel (not illustrated) of the television receiver 200. Audio based on an audio signal obtained by the tuner is output from a speaker (not illustrated) of the television receiver 200 when the AV amplifier 300 is in a system audio mode off state. Audio based on an audio signal obtained by the tuner is output from the speaker group 350 connected to the AV amplifier 300 when the AV amplifier 300 is in a system audio mode on state.

An audio signal obtained by the tuner of the television receiver 200 is regarded as an optical digital signal, for example, and is supplied to the AV amplifier 300 via the optical cable 702. The on/off setting of the system audio mode in the AV amplifier 300 can be performed by a user by operating a user operation unit (not illustrated) of the AV amplifier 300, or can be performed by the user by operating a user operation unit (not illustrated) of the television receiver 200. Also, the on/off setting of the system audio mode in the AV amplifier 300 can be performed through a speaker switch instruction that is provided through an operation of the remote control 800 of the television receiver 200.

In the AV system 100 illustrated in FIG. 1, the following operation is performed when a user watches/listens to content that is played back from a disc by the video recorder 400 or a program selected by the tuner by performing a switching operation from the television receiver 200, an operation of a playback button of the video recorder 400, or the like.

That is, an image based on a video signal output from the video recorder 400 is displayed on the display panel (not illustrated) of the television receiver 200. In this case, the video signal output from the video recorder 400 is supplied to the television receiver 200 via the HDMI cable 703, the AV amplifier 300, and the HDMI cable 701.

Audio based on an audio signal output from the video recorder 400 is output from the speaker (not illustrated) of the television receiver 200 when the AV amplifier 300 is in a system audio mode off state. In this case, the audio signal output from the video recorder 400 is supplied to the television receiver 200 via the HDMI cable 703, the AV amplifier 300, and the HDMI cable 701.

Audio based on an audio signal output from the video recorder 400 is output from the speaker group 350 connected to the AV amplifier 300 when the AV amplifier 300 is in a system audio mode on state. In this case, the audio signal output from the video recorder 400 is supplied to the AV amplifier 300 via the HDMI cable 703.

In the AV system 100 illustrated in FIG. 1, the following operation is performed when a user watches/listens to content that is played back from a disc by the video player 500 by performing a switching operation from the television receiver 200, an operation of a playback button of the video player 500, or the like.

That is, an image based on a video signal output from the video player 500 is displayed on the display panel (not illustrated) of the television receiver 200. In this case, the video signal output from the video player 500 is supplied to the television receiver 200 via the HDMI cable 704, the AV amplifier 300, and the HDMI cable 701.

Audio based on an audio signal output from the video player 500 is output from the speaker (not illustrated) of the television receiver 200 when the AV amplifier 300 is in a system audio mode off state. In this case, the audio signal output from the video player 500 is supplied to the television receiver 200 via the HDMI cable 704, the AV amplifier 300, and the HDMI cable 701.

Audio based on an audio signal output from the video player 500 is output from the speaker group 350 connected to the AV amplifier 300 when the AV amplifier 300 is in a system audio mode on state. In this case, the audio signal output from the video player 500 is supplied to the AV amplifier 300 via the HDMI cable 704.

In the AV system 100 illustrated in FIG. 1, the following operation is performed when a user watches/listens to content that is played back from a disc by the video recorder 600 or a program selected by the tuner by performing a switching operation from the television receiver 200 or the like.

That is, an image based on a video signal output from the video recorder 600 is displayed on the display panel (not illustrated) of the television receiver 200. In this case, the video signal output from the video recorder 600 is supplied to the television receiver 200 via the HDMI cable 705, the AV amplifier 300, and the HDMI cable 701.

Audio based on an audio signal output from the video recorder 600 is output from the speaker (not illustrated) of the television receiver 200 when the AV amplifier 300 is in a system audio mode off state. In this case, the audio signal output from the video recorder 600 is supplied to the television receiver 200 via the HDMI cable 705, the AV amplifier 300, and the HDMI cable 701.

Audio based on an audio signal output from the video recorder 600 is output from the speaker group 350 connected to the AV amplifier 300 when the AV amplifier 300 is in a system audio mode on state. In this case, the audio signal output from the video recorder 600 is supplied to the AV amplifier 300 via the HDMI cable 705.

2. Configuration Example of Television Receiver (FIGS. 3 and 4)

Figure 3:
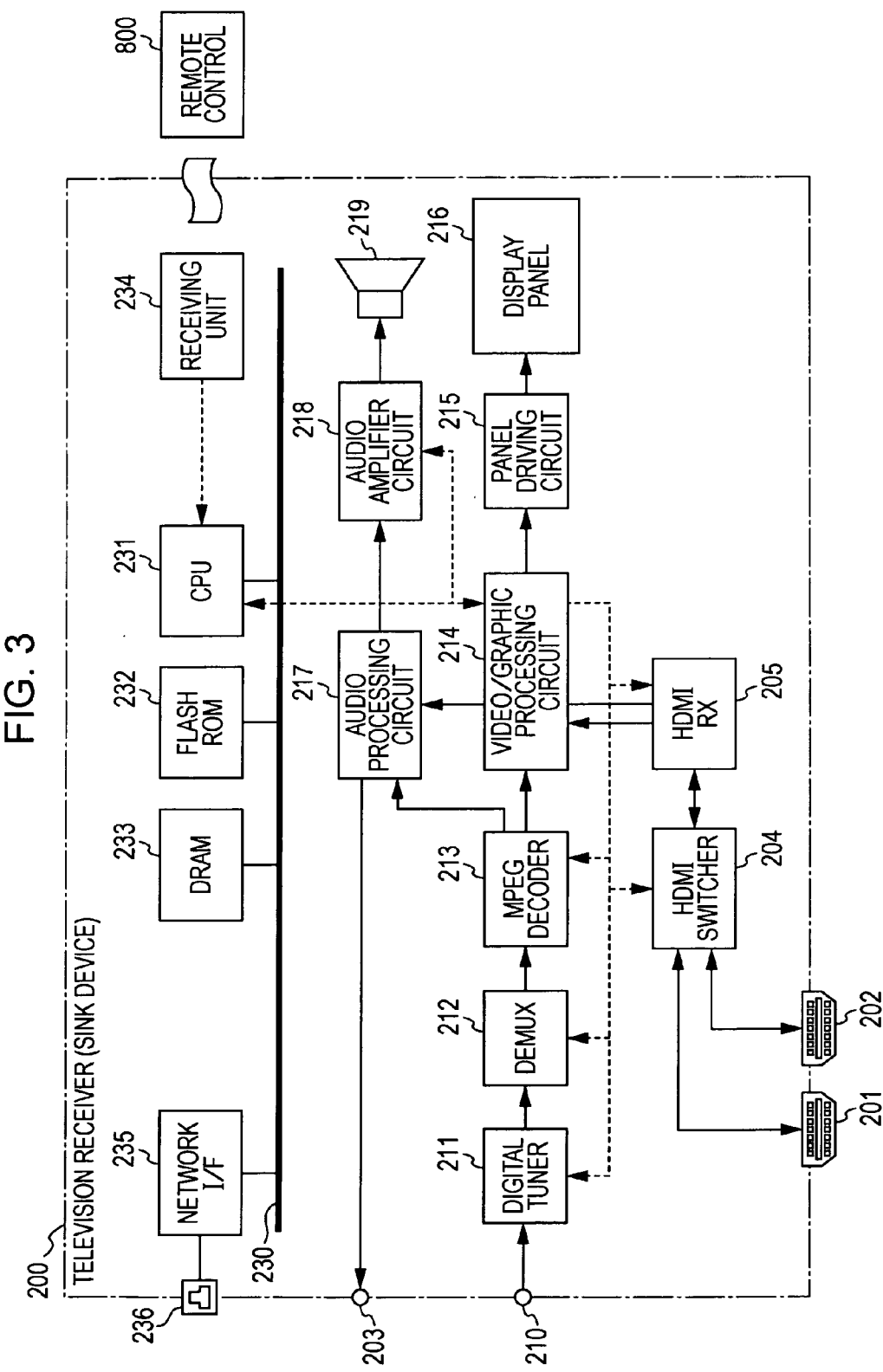
FIG. 3 is a block diagram illustrating a configuration example of a television receiver, serving as a sink device, included in the AV system according to an embodiment of the present invention.
Figure 4:
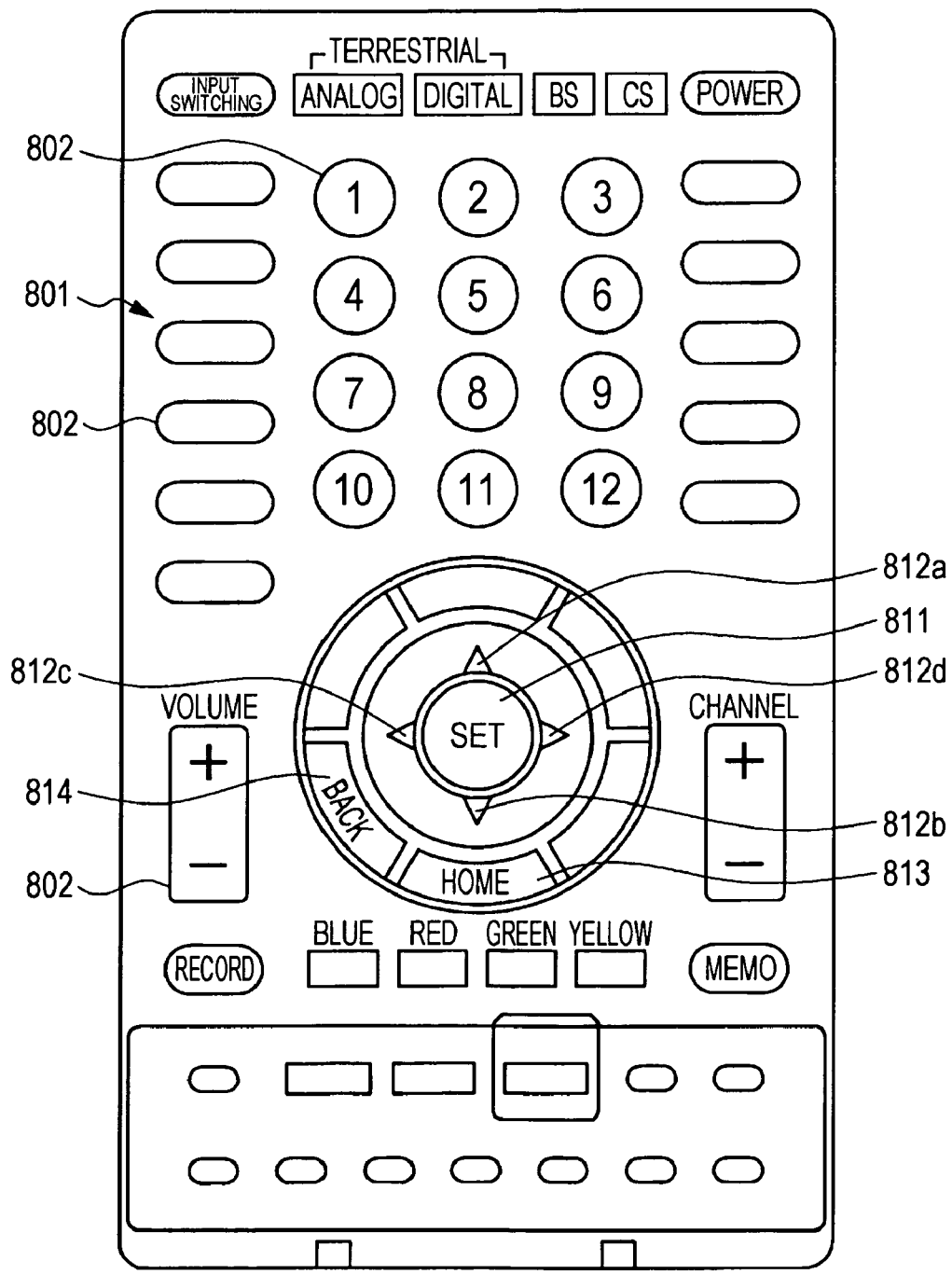
FIG. 4 is a plan view illustrating a configuration example of a remote control for the television receiver according to an embodiment of the present invention.

FIG. 3 illustrates a configuration example of the television receiver 200 according to this embodiment. The television receiver 200 includes the HDMI terminals 201 and 202, an HDMI switcher 204, an HDMI receiving unit 205, an antenna terminal 210, and a digital tuner 211. Also, the television receiver 200 includes a demultiplexer (demux) 212, a Moving Picture Experts Group (MPEG) decoder 213, a video/graphic processing circuit 214, a panel driving circuit 215, and a display panel 216. Furthermore, the television receiver 200 includes an audio processing circuit 217, an audio amplifier circuit 218, and a speaker 219. Furthermore, the television receiver 200 includes an internal bus 230, a central processing unit (CPU) 231, a flash read only memory (ROM) 232, a dynamic random access memory (DRAM) 233, a receiving unit 234, a network I/F 235, and a network terminal 236.

The CPU 231 controls operations of the individual units of the television receiver 200. The flash ROM 232 stores control software and data and also stores an application that is downloaded from the application server 12 as necessary. The DRAM 233 serves as a work area or the like of the CPU 231. The CPU 231 expands software or data read from the flash ROM 232 on the DRAM 233 to start the software, and controls the individual units of the television receiver 200. The CPU 231, the flash ROM 232, and the DRAM 233 are connected to the internal bus 230.

The receiving unit 234 receives an infrared remote control signal (remote control code) transmitted from the remote control 800 and supplies it to the CPU 231. A user can operate the television receiver 200 and other CEC-compatible devices connected to the television receiver 200 via HDMI cables by operating the remote control 800.

The network I/F 235 accesses the network 11 via a network cable connected to the network terminal 236, thereby transmitting data to/receiving data from various devices connected to the network 11 (e.g., the application server 12). In this embodiment, the television receiver 200 requests provision of an application for controlling the AV amplifier 300 to the application server 12, and receives the application from the application server 12, thereby being able to start and perform the application for controlling the AV amplifier 300.

The antenna terminal 210 is a terminal for inputting a television broadcast signal that is received by a receiving antenna (not illustrated). The digital tuner 211 processes the television broadcast signal input to the antenna terminal 210 and outputs a predetermined transport stream corresponding to a channel selected by the user. The demultiplexer 212 extracts, from the transport stream obtained in the digital tuner 211, a partial transport stream (TS) corresponding to the channel selected by the user (TS packets of video data and TS packet of audio data).

Also, the demultiplexer 212 extracts, from the transport stream obtained in the digital tuner 211, program specific information/service information (PSI/SI), and outputs it to the CPU 231. A plurality of channels are multiplexed into the transport stream obtained in the digital tuner 211. A process of extracting a partial TS of an arbitrary channel from the transport stream can be performed by obtaining information about a packet ID (PID) of the arbitrary channel from the PSI/SI (program association table/program map table (PAT/PMT)).

The MPEG decoder 213 performs a decoding process on a video packetized elementary stream (PES) packet, which is constituted by TS packets of video data obtained in the demultiplexer 212, thereby obtaining video data. Also, the MPEG decoder 213 performs a decoding process on an audio PES packet, which is constituted by TS packets of audio data obtained in the demultiplexer 212, thereby obtaining audio data.

The video/graphic processing circuit 214 performs a scaling process, a graphics data superimposing process, or the like as necessary on the video data obtained in the MPEG decoder 213. Also, the video/graphic processing circuit 214 generates image data by performing a process based on an application stored in advance in the flash ROM 232 or an application provided from the application server 12 as necessary, and outputs the image data to the panel driving circuit 215. The panel driving circuit 215 drives the display panel 216 on the basis of video data output from the video/graphic processing circuit 214. The display panel 216 includes a liquid crystal display (LCD), an organic electroluminescence (EL) display, a plasma display panel (PDP), or the like.

The audio processing circuit 217 performs a necessary process, such as digital-to-analog (DA) conversion, on the audio data obtained in the MPEG decoder 213. The audio amplifier circuit 218 amplifies an analog audio signal output from the audio processing circuit 217 and supplies it to the speaker 219. Also, the audio processing circuit 217 converts the audio data obtained in the MPEG decoder 213 into a digital optical signal and outputs it to the light output terminal 203.

The HDMI switcher 204 selectively connects the HDMI terminal 201 or 202 to the HDMI receiving unit 205. The HDMI receiving unit 205 is selectively connected to the HDMI terminal 201 or 202 via the HDMI switcher 204. The HDMI receiving unit 205 receives video and audio data transmitted from an external device (source device or repeater device) connected to the HDMI terminal 201 or 202 through communication based on HDMI. The details of the HDMI receiving unit 205 will be described below.

The operation of the television receiver 200 illustrated in FIG. 3 will be briefly described. A television broadcast signal input to the antenna terminal 210 is supplied to the digital tuner 211. The digital tuner 211 processes the television broadcast signal, so that a transport stream corresponding to a channel selected by a used can be obtained. The transport stream is supplied to the demultiplexer 212. The demultiplexer 212 extracts, from the transport stream, a partial TS (TS packets of video data and TS packets of audio data) corresponding to the channel selected by the user. The partial TS is supplied to the MPEG decoder 213.

The MPEG decoder 213 performs a decoding process on a video PES packet constituted by the TS packets of video data, so that video data is obtained. The video/graphic processing circuit 214 performs a scaling process, a graphics data superimposing process, or the like as necessary on the video data, and then supplies it to the panel driving circuit 215. Accordingly, an image corresponding to the channel selected by the user is displayed on the display panel 216.

Also, the MPEG decoder 213 performs a decoding process on an audio PES packet constituted by the TS packets of audio data, so that audio data is obtained. The audio processing circuit 217 performs a necessary process, such as D/A conversion, on the audio data. The audio amplifier circuit 218 amplifies the audio data and supplies it to the speaker 219. Accordingly, audio corresponding to the channel selected by the user is output from the speaker 219.

The audio data obtained in the MPEG decoder 213 is converted into a digital optical signal based on a Sony Philips digital interface (S/PDIF) standard, for example, by the audio processing circuit 217, and is output to the light output terminal 203. Accordingly, the television receiver 200 can transmit the audio data to an external device via an optical cable. As described above, in the AV system 100 illustrated in FIG. 1, audio data from the television receiver 200 is supplied to the AV amplifier 300 via the optical cable 702.

When the AV amplifier 300 is in a system audio mode on state, audio based on the audio data supplied from the television receiver 200 is output from the speaker group 350 connected to the AV amplifier 300. In this case, the CPU 231 causes the audio amplifier circuit 218 to be in a muting state, and audio is not output from the speaker 219 of the television receiver 200.

In the HDMI receiving unit 205, video data and audio data input to the HDMI terminals 201 and 202 via the HDMI cables are obtained. The video data is supplied to the video/graphic processing circuit 214. The audio data is supplied to the audio processing circuit 217. Thereafter, an operation similar to that at the reception of a television broadcast signal described above is performed, so that an image is displayed on the display panel 216 and that audio is output from the speaker 219.

In a case where a user watches/listens to images and audio based on the video data and audio data supplied from the video recorder 400, the video player 500, or the video recorder 600 in the AV system 100 illustrated in FIG. 1, the user watches/listens to images and audio based on the video data and audio data obtained by the HDMI receiving unit 205, as described above.

In this case, too, when the AV amplifier 300 is in a system audio mode on state, audio based on the audio data is output from the speaker group 350 connected to the AV amplifier 300. At this time, the audio amplifier circuit 218 of the television receiver 200 is in a muting state, so that audio is not output from the speaker 219.

FIG. 4 is a front view illustrating an example of the shape of the remote control 800. As illustrated in FIG. 4, the remote control 800 includes a remote control signal transmitting unit 801 for transmitting an infrared signal or the like, where various operation keys 802 are arranged. The operations keys 802 include numeral keys for selecting a channel, a volume up/down key, and keys for setting various modes. Furthermore, the remote control 800 includes a set button 811 for selecting an arbitrary item from various menu screens displayed on the display panel 216, an up button 812a for moving a cursor displayed on the display panel 216 upward, a down button 812b for moving the cursor displayed on the display panel 216 downward, a left button 812c for moving the cursor displayed on the display panel 216 to the left, a right button 812d for moving the cursor displayed on the display panel 216 to the right, a home button 813 for causing the display panel 216 to display a screen for causing the television receiver 200 to perform an application, and a back button 814 for displaying the preceding screen. The remote control 800 may have a configuration of transmitting a signal other than an infrared signal, or may have a configuration of transmitting a signal to/receiving a signal from the television receiver 200 in a bidirectional manner. The shape and button arrangement of the remote control 800 are not limited to those described above.

3. Configuration Example of AV Amplifier (FIG. 5)

Figure 5:
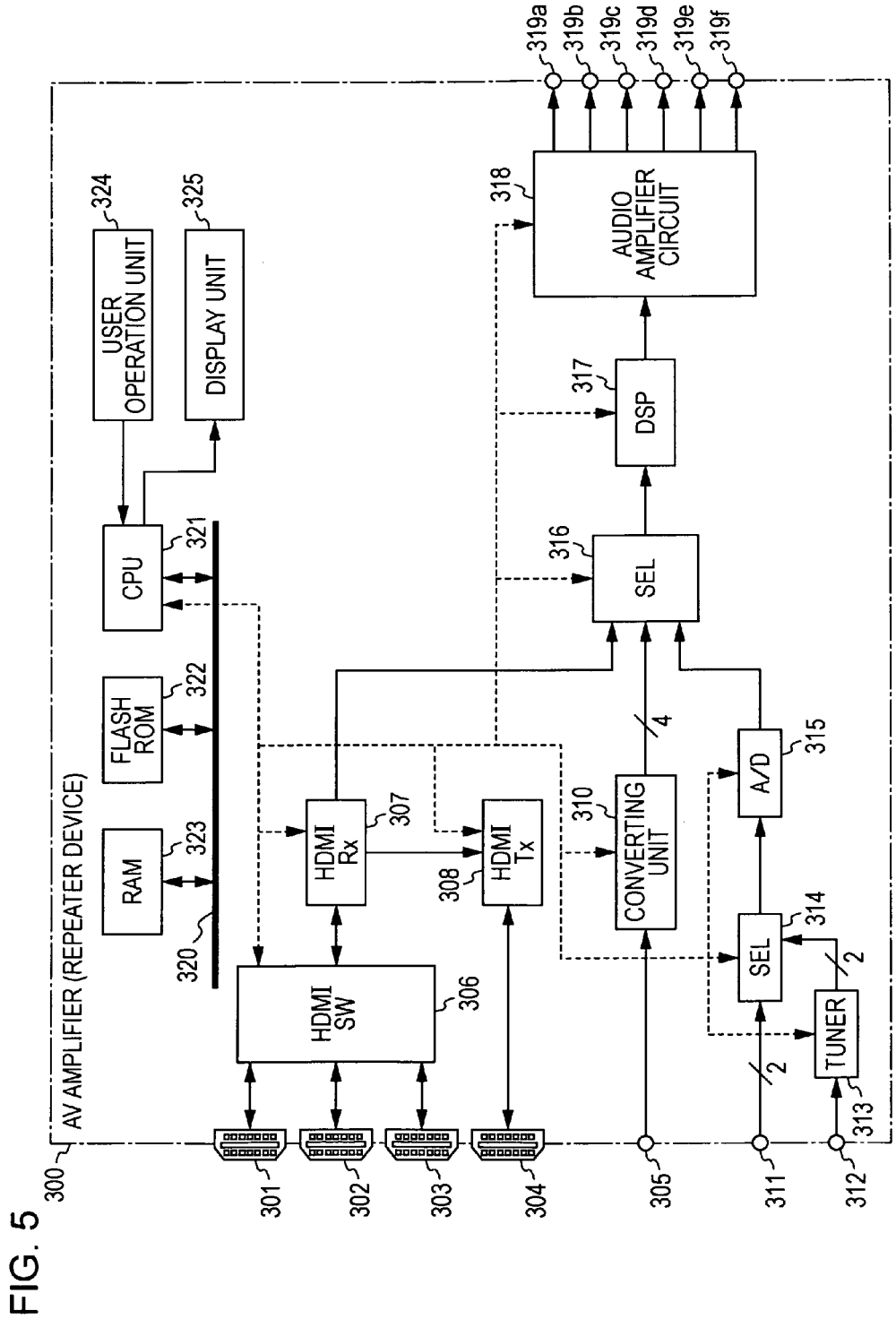
FIG. 5 is a block diagram illustrating a configuration example of an AV amplifier, serving as a repeater device, included in the AV system according to an embodiment of the present invention.

FIG. 5 illustrates a configuration example of the AV amplifier 300. The AV amplifier 300 includes the HDMI terminals 301 to 304, the light input terminal 305, an HDMI switcher 306, an HDMI receiving unit 307, an HDMI transmitting unit 308, and a converting unit 310. Also, the AV amplifier 300 includes an analog audio input terminal 311, an antenna terminal 312, an FM tuner 313, a selector 314, an analog-to-digital (A/D) converter 315, a selector 316, and a digital signal processor (DSP) 317. Furthermore, the AV amplifier 300 includes an audio amplifier circuit 318, audio output terminals 319a to 319f, an internal bus 320, a CPU 321, a flash ROM 322, and a RAM 323.

The CPU 321 controls operations of the individual units of the AV amplifier 300. The flash ROM 322 stores control software and data. The RAM 323 serves as a work area or the like of the CPU 321. The CPU 321 expands software or data read from the flash ROM 322 on the RAM 323 to start the software, and controls the individual units of the AV amplifier 300. The CPU 321, the flash ROM 322, and the RAM 323 are connected to the internal bus 320. The CPU 321, the flash ROM 322, and the RAM 323 may be a one-chip microcomputer.

A user operation unit 324 and a display unit 325 are connected to the CPU 321. The user operation unit 324 and the display unit 325 constitute a user interface. With the user operation unit 324, a user can select output audio of the AV amplifier 300, select a station of the FM tuner 313, and set an operation. Also, with the user operation unit 324, a user can set on/off of the system audio mode.

The user operation unit 324 includes keys, buttons, a dial, a remote control signal transmitting/receiving unit, etc., arranged on a casing (not illustrated) of the AV amplifier 300. The display unit 325 displays the operation status of the AV amplifier 300 and a user operation status, and includes a fluorescent display tube, an LCD, or the like.

The light input terminal 305 is a terminal for inputting a digital optical signal through an optical cable. The converting unit 310 generates, from the digital optical signal input to the light input terminal 305, a clock LRCK having a frequency identical to the sampling frequency of an audio signal (e.g., 44.1 kHz), a master clock MCK having a frequency 512 or 256 times the sampling frequency, left audio data LDATA and right audio data RDATA that exist at every period of the clock LRCK and that have 24 bits, and a bit clock BCK that synchronizes each bit of data, and supplies them to the selector 316.

The analog audio input terminal 311 is a terminal for inputting right and left analog audio signals obtained in an external device. The antenna terminal 312 is a terminal for inputting an FM broadcast signal received by an FM receiving antenna (not illustrated). The FM tuner 313 processes the FM broadcast signal (radio broadcast signal) input to the antenna terminal 312 and outputs right and left analog audio signals corresponding to a channel selected by a user. The selector 314 selects the analog audio signal input to the analog audio input terminal 311 or the analog audio signal output from the tuner 313. The A/D converter 315 converts the analog audio signal selected by the selector 314 into digital audio data and supplies it to the selector 316.

The HDMI switcher 306 selectively connects the HDMI terminals 301 to 303 to the HDMI receiving unit 307. The HDMI receiving unit 307 is selectively connected to any of the HDMI terminals 301 to 303 via the HDMI switcher 306. The HDMI receiving unit 307 receives video data and audio data that are transmitted in a unidirectional manner from an external device (source device) connected to the HDMI terminal 301, 302, or 303, through HDMI-compatible communication.

The HDMI receiving unit 307 supplies the audio data to the selector 316 and supplies the video data and audio data to the HDMI transmitting unit 308. The HDMI transmitting unit 308 transmits the baseband video and audio data supplied from the HDMI receiving unit 307 from the HDMI terminal 304 through HDMI-compatible communication. Accordingly, the AV amplifier 300 realizes a repeater function. The details of the HDMI receiving unit 307 and the HDMI transmitting unit 308 will be described below.

The selector 316 selects the audio data supplied from the HDMI receiving unit 307, the audio data supplied from the converting unit 310, or the audio data supplied from the A/D converter 315, and supplies the selected audio data to the DSP 317.

The DSP 317 processes the audio data obtained in the selector 316, and performs a process of generating audio data of individual channels for realizing surround sound, a process of giving a predetermined sound field characteristic or acoustic characteristic, a process of converting a digital signal into an analog signal, etc. For example, the DSP 317 is capable of performing a sound field process of 5.1-channel surround sound, and is also capable of setting another mode, such as 2-channel audio. The audio amplifier circuit 318 amplifies a front-left audio signal SFL, a front-right audio signal SFR, a front-center audio signal SFC, a rear-left audio signal SRL, a rear-right audio signal SRR, and a subwoofer audio signal SSW output from the DSP 317, and outputs those signals to the audio output terminals 319a to 319f.

Although not illustrated, the speakers constituting the speaker group 350 are connected to the audio output terminals 319a to 319f, respectively. That is, a front-left speaker, a front-right speaker, a front-center speaker, a rear-left speaker, a rear-right speaker, and a subwoofer speaker are connected. Alternatively, surround sound may be realized with a smaller number of speakers using a virtual sound image localization process performed by the DSP 317.

Now, the operation of the AV amplifier 300 illustrated in FIG. 5 will be briefly described. In the HDMI receiving unit 307, baseband video and audio data that is input to the HDMI terminal 301, 302, or 303 via the HDMI cable can be obtained. The video and audio data is supplied to the HDMI transmitting unit 308 and is output the HDMI cable connected to the HDMI terminal 304.

The audio data obtained in the HDMI receiving unit 307 is supplied to the selector 316. The selector 316 selects the audio data supplied from the HDMI receiving unit 307, the audio data supplied from the converting unit 310, or the audio data supplied from the A/D converter 315, and supplies the selected audio data to the DSP 317.

The DSP 317 performs necessary processes, such as a process of generating audio data of individual channels for realizing 5.1-channel surround sound, a process of giving a predetermined sound field characteristic, and a process of converting a digital signal into an analog signal, on the audio data. The audio signals of the individual channels output from the DSP 317 are output to the audio output terminals 319a to 319f via the audio amplifier circuit 318.

For example, in a case where a user watches/listens to a program selected by the digital tuner 211 of the television receiver 200 in the AV system 100 illustrated in FIG. 1 and where the AV amplifier 300 is in a system audio mode on state, the following operation is performed. That is, the selector 316 selects the audio data supplied from the converting unit 310. Accordingly, the audio signals of the individual channels corresponding to the audio data of the program selected by the digital tuner 211 of the television receiver 200 are output to the audio output terminals 319*a* to 319*f*. Accordingly, audio of the program selected by the digital tuner 211 of the television receiver 200 is output from the speaker group 350 connected to the AV amplifier 300.

In a case where a user watches/listens to a program selected by the digital tuner 211 of the television receiver 200 and where the AV amplifier 300 is in a system audio mode off state, the audio amplifier circuit 318 is in a muting state. Thus, no audio signal is supplied from the audio amplifier circuit 318 to the audio output terminals 319*a* to 319*f*.

Also, in a case where a user watches/listens to video and audio based on video data and audio data supplied from the video recorder 400 in the AV system 100 illustrated in FIG. 1 and where the AV amplifier 300 is in a system audio mode on state, the following operation is performed. That is, the HDMI switcher 306 causes the HDMI terminal 301 to be connected to the HDMI receiving unit 307. The selector 316 selects the audio data supplied from the HDMI receiving unit 307. Accordingly, audio signals of the individual channels corresponding to the audio data supplied from the video recorder 400 are output to the audio output terminals 319*a* to 319*f*. Accordingly, audio based on the audio data supplied from the video recorder 400 is output from the speaker group 350 connected to the AV amplifier 300.

In a case where a user watches/listens to video and audio based on the video data and audio data supplied from the video recorder 400 and where the AV amplifier 300 is in a system audio mode off state, the audio amplifier circuit 318 is in a muting state, so that no audio signal is supplied from the audio amplifier circuit 318 to the audio output terminals 319*a* to 319*f*.

Also, in a case where a user watches/listens to video and audio based on video data and audio data supplied from the video player 500 in the AV system 100 illustrated in FIG. 1 and where the AV amplifier 300 is in a system audio mode on state, the following operation is performed. That is, the HDMI switcher 306 causes the HDMI terminal 302 to be connected to the HDMI receiving unit 307. The selector 316 selects the audio data supplied from the HDMI receiving unit 307. Accordingly, audio signals of the individual channels corresponding to the audio data supplied from the video player 500 are output to the audio output terminals 319*a* to 319*f*. Accordingly, audio based on the audio data supplied from the video player 500 is output from the speaker group 350 connected to the AV amplifier 300.

In a case where a user watches/listens to video and audio based on the video data and audio data supplied from the video player 500 and where the AV amplifier 300 is in a system audio mode off state, the audio amplifier circuit 318 is in a muting state, so that no audio signal is supplied from the audio amplifier circuit 318 to the audio output terminals 319*a* to 319*f*.

4. Configuration Example of Application Server (FIG. 6)

Figure 6:
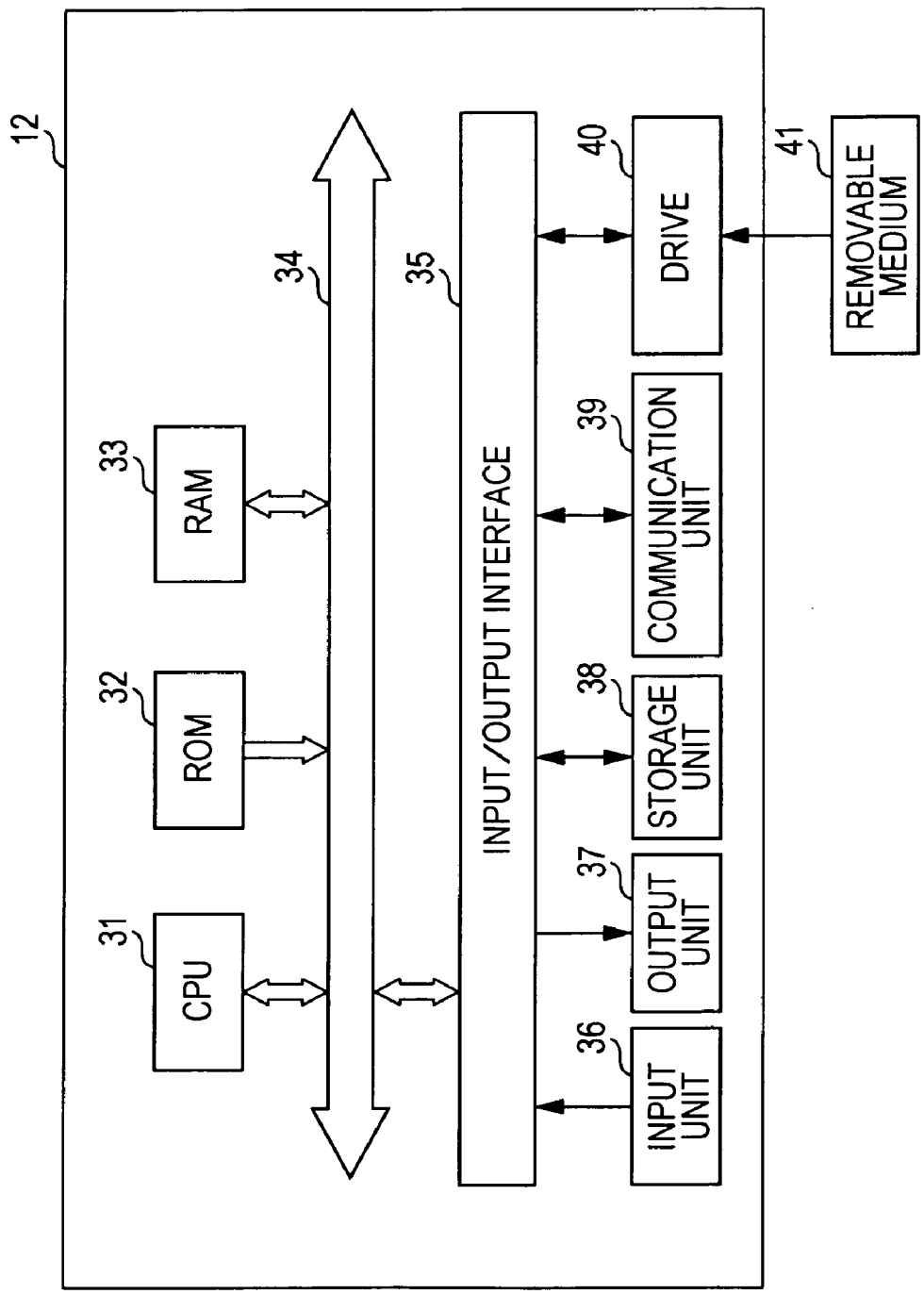
FIG. 6 is a block diagram illustrating a configuration example of an application server according to an embodiment of the present invention.

FIG. 6 illustrates a configuration example of the application server 12. The application server 12 includes a CPU 31, a ROM 32, a RAM 33, a bus 34, an input/output interface 35, an input unit 36, an output unit 37, a storage unit 38, a communication unit 39, and a drive 40.

The CPU 31, the ROM 32, and the RAM 33 are mutually connected via the bus 34. The input/output interface 35 is connected to the bus 34. Also, the input unit 36 including a keyboard, a mouse, and a microphone, the output unit 37 including a display and a speaker, the storage unit 38 including a hard disk and a nonvolatile memory, the communication unit 39 including a network interface, and the drive 40 for driving a removable medium 41, such as a magnetic disk, an optical disc, a magneto-optical disc, and a semiconductor memory, are connected to the input/output interface 35.

In the application server 12 having the above-described configuration, the CPU 31 loads a program stored in the storage unit 38 to the RAM 33 via the input/output interface 35 and the bus 34 and performs the program, so that an application can be appropriately provided in response to a request from the television receiver 200.

Figure 8:
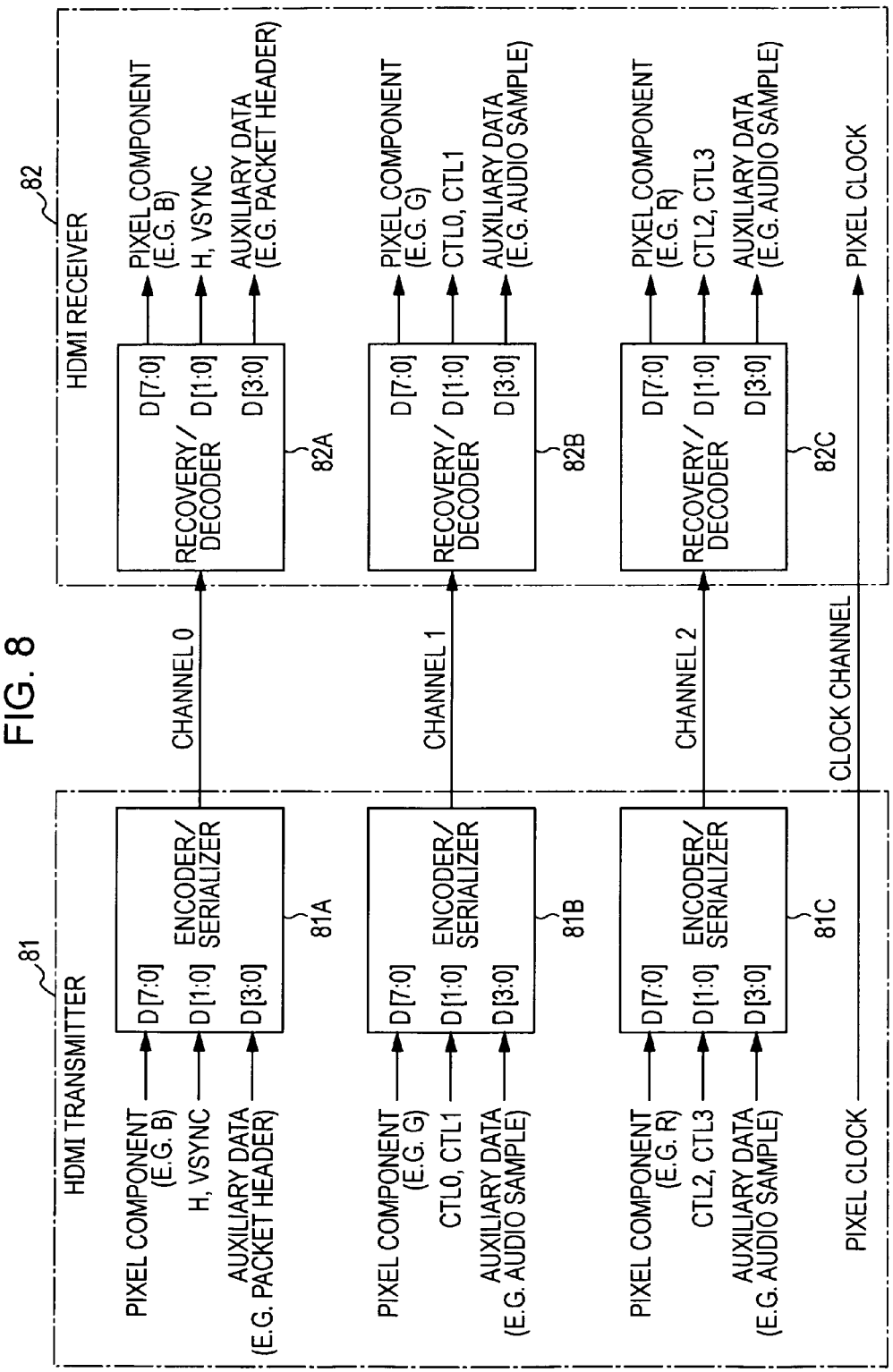
FIG. 8 is a block diagram illustrating a configuration example of an HDMI transmitter and an HDMI receiver.
Figure 9:
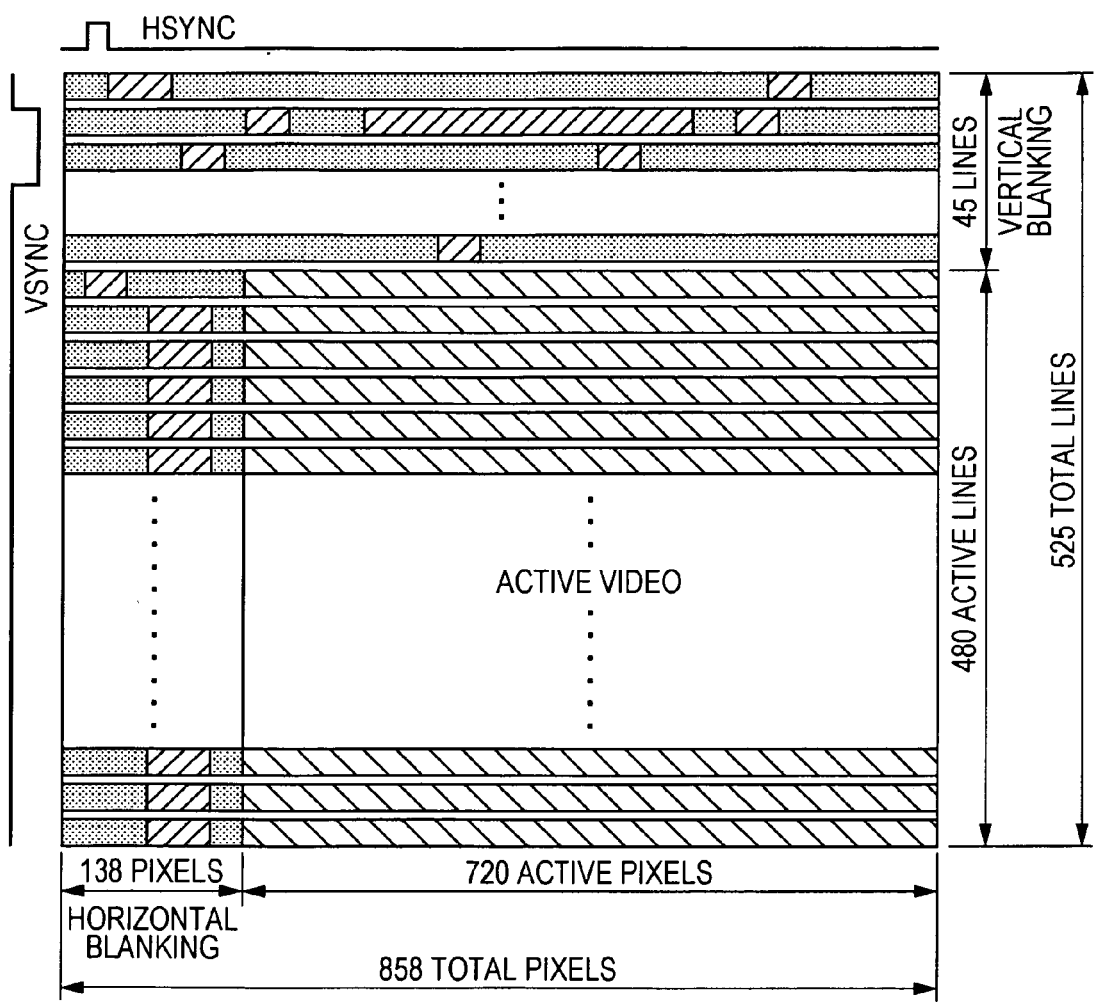
FIG. 9 is a diagram illustrating a structure of a TMDS transmission data.

5. Example of Transmission Configuration and Processing of HDMI Standard (FIGS. 7 to 9)

Figure 7:
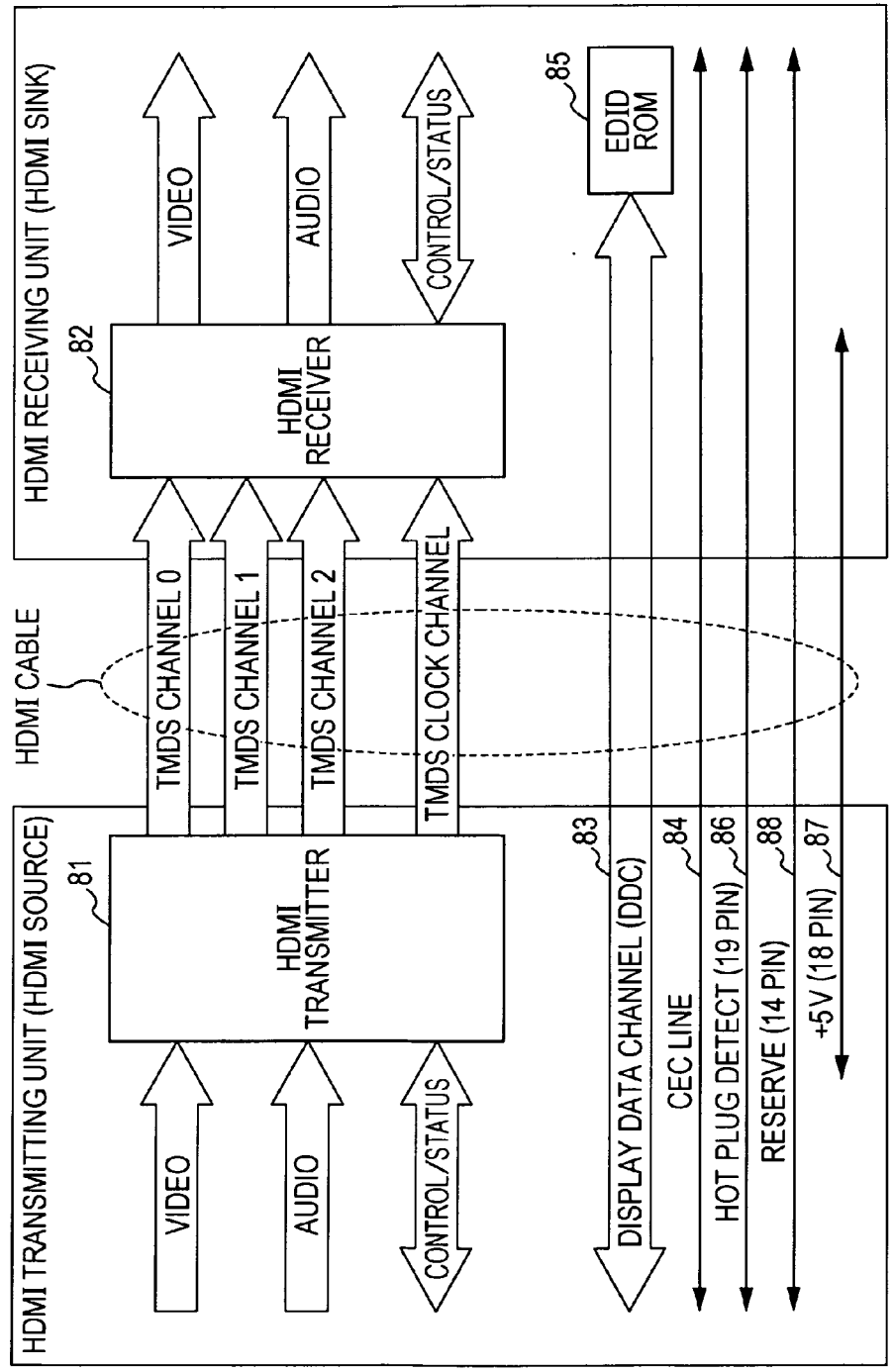
FIG. 7 is a block diagram illustrating a configuration example of an HDMI transmitting unit as an HDMI source and an HDMI receiving unit as an HDMI sink.

FIG. 7 illustrates a configuration example of an HDMI transmitting unit (HDMI transmitting unit 308) and an HDMI receiving unit (HDMI receiving unit 205 and HDMI receiving unit 307).

The HDMI transmitting unit (HDMI source) performs one unit of transmission in an effective image period (hereinafter also referred to as active video period as necessary), which is a period obtained by removing a horizontal blanking period and a vertical blanking period from a period from one vertical synchronization signal to the next vertical synchronization signal. That is, the HDMI transmitting unit transmits differential signals corresponding to uncompressed pixel data of an image for one screen to the HDMI receiving unit (HDMI sink) in a unidirectional manner through a plurality of channels in the active video period. Also, the HDMI transmitting unit transmits differential signals corresponding to at least audio data accompanying an image, control data, and other auxiliary data to the HDMI receiving unit in a unidirectional manner using a plurality of channels in the horizontal blanking period or the vertical blanking period.

The HDMI transmitting unit includes an HDMI transmitter 81. The HDMI transmitter 81 converts pixel data of an uncompressed image into corresponding differential signals and serially transmits the signals in a unidirectional manner to the HDMI receiving unit connected via the HDMI cable using a plurality of channels: three TMDS channels #0, #1, and #2.

Also, the HDMI transmitter 81 converts audio data accompanying an uncompressed image, necessary control data, and other auxiliary data into corresponding differential signals. Then, the HDMI transmitter 81 serially transmits the signals in a unidirectional manner to the HDMI receiving unit connected via the HDMI cable using the three TMDS channels #0, #1, and #2.

Furthermore, the HDMI transmitter 81 transmits a pixel clock synchronized with the pixel data, which is transmitted using the three TMDS channels #0, #1, and #2, to the HDMI receiving unit connected via the HDMI cable using a TMDS clock channel. Here, in each TMDS channel #i (i=0, 1, or 2), 10-bit pixel data is transmitted in one clock of the pixel clock.

The HDMI receiving unit receives the differential signals corresponding to the pixel data transmitted in a unidirectional manner from the HDMI transmitting unit using the plurality of channels in the active video period. Also, the HDMI receiving unit receives the differential signals corresponding to the audio data and control data transmitted in a unidirectional manner from the HDMI transmitting unit using the plurality of channels in the horizontal blanking period or the vertical blanking period.

Specifically, the HDMI receiving unit includes an HDMI receiver 82. The HDMI receiver 82 receives a differential signal corresponding to pixel data and differential signals corresponding to audio data and control data transmitted in a unidirectional manner from the HDMI transmitting unit using the TMDS channels #0, #1, and #2. At this time, the HDMI receiver 82 receives the differential signals in synchronization with the pixel clock transmitted from the HDMI transmitting unit using the TMDS clock channel.

The transmission channels of the HDMI system include the three TMDS channels #0 to #2 serving as transmission channels for serially transmit pixel data and audio data, the TMDS clock channel serving as a transmission channel for transmitting a pixel clock, and transmission channels called a display data channel (DDC) 83 and a CEC line 84.

The DDC 83 is used by the HDMI transmitting unit to read enhanced extended display identification data (E-EDID) from the HDMI receiving unit connected thereto via the HDMI cable. The DDC 83 includes two signal lines (not illustrated) included in the HDMI cable.

That is, the HDMI receiving unit includes, in addition to the HDMI receiver 82, an EDID ROM 85. The EDID ROM 85 stores E-EDID, which is performance information about its performance (configuration/capability). The HDMI transmitting unit reads the E-EDID of the HDMI receiving unit from the HDMI receiving unit connected thereto via the HDMI cable using the DDC 83. On the basis of the read E-EDID, the HDMI transmitting unit recognizes the format (profile) of images compatible with the electronic device including the HDMI receiving unit, e.g., RGB, YCbCr 4:4:4, YCbCr 4:2:2, or the like.

The CEC line 84 includes a single signal line (not illustrated) included in the HDMI cable and is used for bidirectional communication of control data between the HDMI transmitting unit and the HDMI receiving unit. The bidirectional communication is performed in a time-division manner.

Also, the HDMI cable includes a line 86 connected to a pin called hot plug detect (HPD). The source device can detect connection of the sink device using the line 86. Also, the HDMI cable includes a line 87 used for supplying power from the source device to the sink device. Furthermore, the HDMI cable includes a reserve line 88.

FIG. 8 illustrates a configuration example of the HDMI transmitter 81 and the HDMI receiver 82 illustrated in FIG. 7.

The HDMI transmitter 81 includes three encoders/serializers 81A, 81B, and 81C corresponding to the three TMDS channels #0, #1, and #2, respectively. Each of the encoders/serializers 81A, 81B, and 81C encodes image data, auxiliary data, and control data supplied thereto, converts the supplied data from parallel data into serial data, and transmits the serial data as differential signals.

Now, assume that the image data has three components of red (R), green (G), and blue (B). In this case, the B component is supplied to the encoder/serializer 81A, the G component is supplied to the encoder/serializer 81B, and the R component is supplied to the encoder/serializer 81C.

The auxiliary data includes, for example, audio data and a control packet. The control packet is supplied to the encoder/serializer 81A, and the audio data is supplied to the encoders/serializers 81B and 81C, for example.

Furthermore, the control data includes a 1-bit vertical synchronization signal (VSYNC), a 1-bit horizontal synchronization signal (HSYNC), and 1-bit control bits CTL0, CTL1, CTL2, and CTL3. The vertical synchronization signal and the horizontal synchronization signal are supplied to the encoder/serializer 81A. The control bits CTL0 and CTL1 are supplied to the encoder/serializer 81B, and the control bits CTL2 and CTL3 are supplied to the encoder/serializer 81C.

The encoder/serializer 81A transmits the B component of the image data, vertical and horizontal synchronization signals, and auxiliary data supplied thereto in a time-division manner. That is, the encoder/serializer 81A regards the B component of the image data supplied thereto as parallel data in units of 8 bits, which is a fixed number of bits. Furthermore, the encoder/serializer 81A encodes the parallel data, converts the encoded parallel data into serial data, and transmits the serial data using the TMDS channel #0.

Also, the encoder/serializer 81A encodes 2-bit parallel data of the vertical and horizontal synchronization signals supplied thereto, converts the encoded parallel data into serial data, and transmits the serial data using the TMDS channel #0. Furthermore, the encoder/serializer 81A regards the auxiliary data supplied thereto as parallel data in units of 4 bits. Then, the encoder/serializer 81A encodes the parallel data, converts the encoded parallel data into serial data, and transmits the serial data using the TMDS channel #0.

The encoder/serializer 81B transmits the G component of the image data, control bits CTL0 and CTL1, and auxiliary data supplied thereto in a time-division manner. That is, the encoder/serializer 81B regards the G component of the image data supplied thereto as parallel data in units of 8 bits, which is a fixed number of bits. Furthermore, the encoder/serializer 81B encodes the parallel data, converts the encoded parallel data into serial data, and transmits the serial data using the TMDS channel #1.

Also, the encoder/serializer 81B encodes 2-bit parallel data of the control bits CTL0 and CTL1 supplied thereto, converts the encoded parallel data into serial data, and transmits the serial data using the TMDS channel #1. Furthermore, the encoder/serializer 81B regards the auxiliary data supplied thereto as parallel data in units of 4 bits. Then, the encoder/serializer 81B encodes the parallel data, converts the encoded parallel data into serial data, and transmits the serial data using the TMDS channel #1.

The encoder/serializer 81C transmits the R component of the image data, control bits CTL2 and CTL3, and auxiliary data supplied thereto in a time-division manner. That is, the encoder/serializer 81C regards the R component of the image data supplied thereto as parallel data in units of 8 bits, which is a fixed number of bits. Furthermore, the encoder/serializer 81C encodes the parallel data, converts the encoded parallel data into serial data, and transmits the serial data using the TMDS channel #2.

Also, the encoder/serializer 81C encodes 2-bit parallel data of the control bits CTL2 and CTL3 supplied thereto, converts the encoded parallel data into serial data, and transmits the serial data using the TMDS channel #2. Furthermore, the encoder/serializer 81C regards the auxiliary data supplied thereto as parallel data in units of 4 bits. Then, the encoder/serializer 81C encodes the parallel data, converts the encoded parallel data into serial data, and transmits the serial data using the TMDS channel #2.

The HDMI receiver 82 includes three recovery/decoders 82A, 82B, and 82C corresponding to the three TMDS channels #0, #1, and #2, respectively. The recovery/decoders 82A, 82B, and 82C receive image data, auxiliary data, and control data transmitted as differential signals using the TMDS channels #0, #1, and #2, respectively. Furthermore, each of the recovery/decoders 82A, 82B, and 82C converts the image data, the auxiliary data, and the control data from serial data into parallel data, decodes the parallel data, and outputs the decoded parallel data.

That is, the recovery/decoder 82A receives the B component of image data, vertical and horizontal synchronization signals, and auxiliary data transmitted thereto as differential signals using the TMDS channel #0. Then, the recovery/decoder 82A converts the B component of the image data, the vertical and horizontal synchronization signals, and the auxiliary data from serial data into parallel data, decodes the parallel data, and outputs the decoded parallel data.

The recovery/decoder 82B receives the G component of image data, control bits CTL0 and CTL1, and auxiliary data transmitted thereto as differential signals using the TMDS channel #1. Then, the recovery/decoder 82B converts the G component of the image data, the control bits CTL0 and CTL1, and the auxiliary data from serial data into parallel data, decodes the parallel data, and outputs the decoded parallel data.

The recovery/decoder 82C receives the R component of image data, control bits CTL2 and CTL3, and auxiliary data transmitted thereto as differential signals using the TMDS channel #2. Then, the recovery/decoder 82C converts the R component of the image data, the control bits CTL2 and CTL3, and the auxiliary data from serial data into parallel data, decodes the parallel data, and outputs the decoded parallel data.

FIG. 9 illustrates an example of transmission periods in which various pieces of transmission data are transmitted using the three TMDS channels #0, #1, and #2 in HDMI. FIG. 9 illustrates the periods of respective pieces of transmission data in a case where a progressive image having horizontal 720×vertical 480 pixels is transmitted using the TMDS channels #0, #1, and #2.

In a video field where transmission data is transmitted using the three TMDS channels #0, #1, and #2 in HDMI, the following periods exist in accordance with the type of transmission data. That is, three types of periods exist: a video data period; a data island period; and a control period.

The video field period is a period from an active edge of a vertical synchronization signal to an active edge of the next vertical synchronization signal. This period includes a horizontal blanking period, a vertical blanking period, and an active video period. The active video period is a period obtained by removing the horizontal blanking period and the vertical blanking period from the video field period.

The video data period is assigned to the active video period. In the video data period, data of active pixels corresponding to 720 pixels×480 lines constituting uncompressed image data for one screen is transmitted.

The data island period and the control period are assigned to the horizontal blanking period and the vertical blanking period. In the data island period and the control period, auxiliary data is transmitted.

Specifically, the data island period is assigned to part of the horizontal blanking period and the vertical blanking period. In the data island period, data unrelated to control in the auxiliary data, for example, packets of audio data, are transmitted.

The control period is assigned to the other part of the horizontal blanking period and the vertical blanking period. In the control period, data related to control in the auxiliary data, for example, vertical and horizontal synchronization signals and control packets, are transmitted.

In the current HDMI, the frequency of a pixel clock transmitted using the TMDS clock channel is 165 MHz, for example. In this case, the transmission rate in the data island period is about 500 Mbps.

6. Operation Examples of Television Receiver and AV Amplifier (FIGS. 10 to 35)

Next, the operation of the television receiver 200 will be described. First, a description will be given of the content of a screen that is displayed on the display panel 216 when the television receiver 200 performs an application provided from the application server 12 as necessary.

Figure 10:
FIG. 10 is an explanatory view illustrating an example of video displayed on a display panel of the television receiver.

FIG. 10 is an explanatory view illustrating an example of video displayed on the display panel 216 of the television receiver 200. In order to cause the television receiver 200 to perform the application provided from the application server 12 as necessary from this state, a user presses a predetermined button (e.g., the home button 813) of the remote control 800. With the press of the predetermined button of the remote control 800 by the user, a screen for performing the application (hereinafter referred to as "initial screen") can be displayed on the display panel 216 of the television receiver 200.

FIG. 11 is an explanatory view illustrating an example of the initial screen displayed on the display panel 216. On the initial screen illustrated in FIG. 11, an icon 901a for starting an application for operating the AV amplifier 300 by using the remote control 800 of the television receiver 200 (hereinafter referred to as "audio device control application") and a caption 901b of the application are displayed. The broken line in FIG. 11 is provided for explanation, and is not displayed on the actual initial screen.

As a process of displaying the initial screen on the display panel 216, the process disclosed in the International Publication No. 2008/093780 may be used. That is, the television receiver 200 operates to display icons and captions of applications on the display panel 216 on the basis of an application list supplied from the application server 12. The display operation on the display panel 216 is controlled by, for example, the CPU 231, which performs display control on the video/graphic processing circuit 214. The user of the television receiver 200 selects an arbitrary icon for causing the television receiver 200 to perform the application and presses a predetermined button (e.g., the set button 811) of the remote control 800.

FIG. 12 is an explanatory view illustrating an example of a screen that is displayed when the user presses the set button 811 of the remote control 800 in the initial screen illustrated in FIG. 11. When the user presses the set button 811 in the initial screen, broadcasted video received by the television receiver 200 or video transmitted from the video recorder 400 or the like is displayed in a video display area 902 on the display panel 216 as illustrated in FIG. 12. Also, the services of applications that are supplied from the application server 12 in accordance with the press of the set button 811 and that are stored in the flash ROM 232 are started by the CPU 231, and are displayed in application display areas 903, 904, and 905 through a drawing process performed by the video/graphic processing circuit 214 and a panel driving process performed by the panel driving circuit 215. In the example illustrated in FIG. 12, among the services displayed in the application display areas 903, 904 and 905, the service displayed in the application display area 904 is the service of the audio device control application. In an embodiment of the present invention, the screen illustrated in FIG. 12 may be displayed as a result of the press of the predetermined button of the remote control 800 in a state where the screen illustrated in FIG. 10 is displayed, without via the initial screen illustrated in FIG. 11.

As a process of obtaining an application from the application server 12, the process disclosed in the International Publication No. 2008/093780 may be used, for example. The television receiver 200 does not download the entire application at a time from the application server 12, but downloads a latest file from the application server 12 as necessary.

The image displayed in the application display area 904 illustrated in FIG. 12 is an image in a case where the audio device control application has not been set to an active mode after the user has registered the audio device control application in the television receiver 200. Here, registering an application means that, when the user selects an arbitrary application on the initial screen, the user makes a setting on the television receiver 200 so that the service of even an application other than the selected application is started. Of course, it is possible to select an application on the initial screen and start the service of the application even if the application is not registered. The active mode is a mode in which only information provided by one application is displayed on the display panel 216. In contrast, a state where pieces of information provided by a plurality of applications are displayed as illustrated in FIG. 12 is referred to as a normal mode.

FIG. 13 is an explanatory view illustrating an example of a screen that is displayed when the user presses the set button 811 of the remote control 800 in the initial screen illustrated in FIG. 11. When detecting a press of the set button 811, the CPU 231 performs the audio device control application and causes the display panel 216 to display the screen illustrated in FIG. 13. On the screen illustrated in FIG. 13, the display panel 216 displays an image in a case where the audio device control application has been set to the active mode at least once after the user has registered the audio device control application in the television receiver 200. In this way, the image displayed on the display panel 216 may be varied depending on whether the audio device control application has been set to the active mode or not.

In the application display area 904 illustrated in FIG. 13, information indicating that the audio input of the AV amplifier 300 connected to the television receiver 200 is the television receiver 200 (TV) and that the sound field is standard in which no particular audio processing is performed is displayed. The information can be obtained by inquiring the setting of audio input and sound field by using an HDMI-CEC message from the television receiver 200 to the AV amplifier 300 in accordance with an instruction of the CPU 31 of the application server 12 and responding to the inquiry from the AV amplifier 300 to the television receiver 200.

Figure 14A:
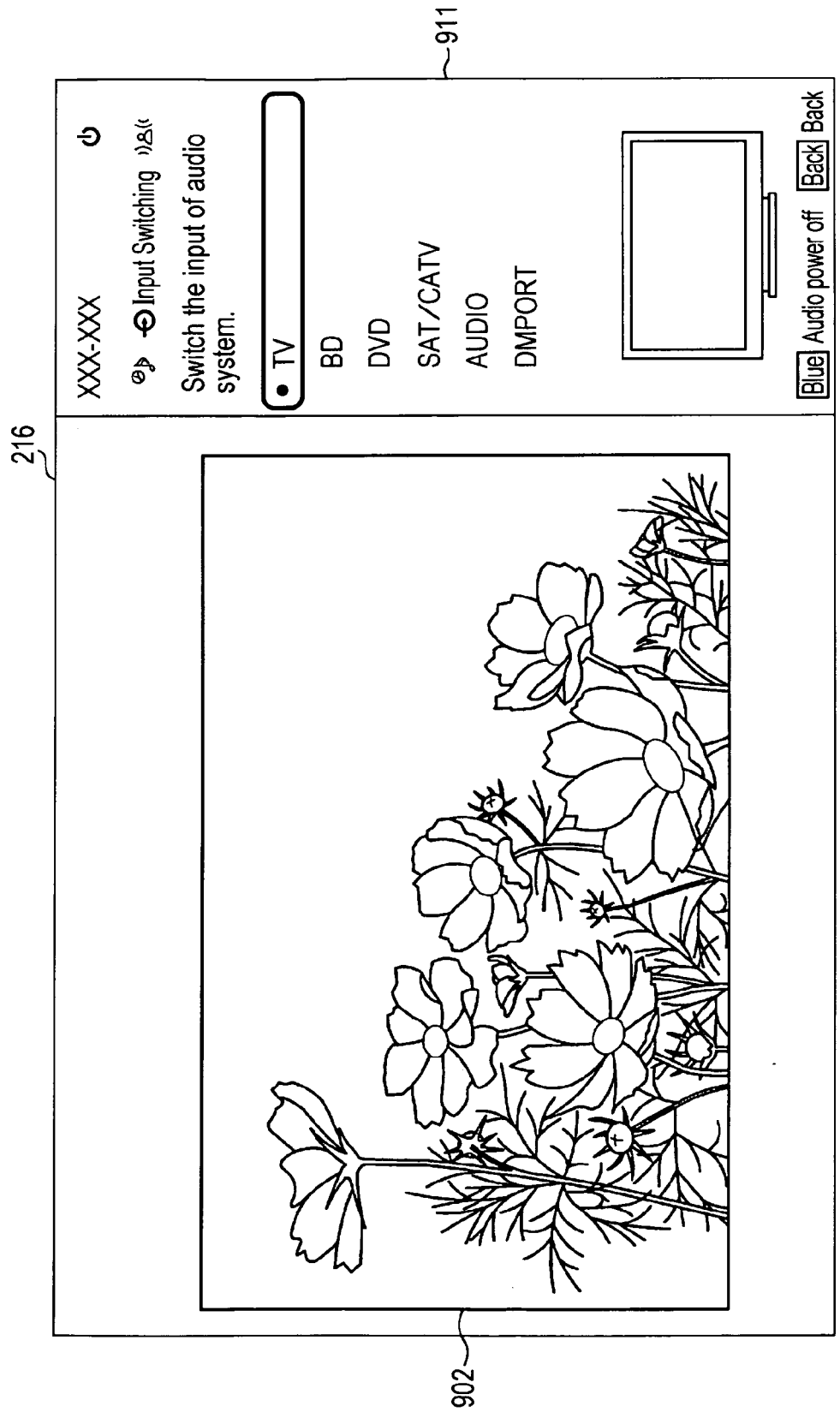
FIG. 14A is an explanatory view illustrating an example of a screen displayed on the display panel.

FIG. 14A is an explanatory view illustrating an example of a screen displayed on the display panel 216 in a case where the user has changed the mode of the audio device control application from the normal mode to the active mode by pressing the set button 811 of the remote control 800 in a state where the screen illustrated in FIG. 13 is displayed on the display panel 216. When detecting the press of the set button 811, the CPU 231 changes the mode of the audio device control application from the normal mode to the active mode so as to change the screen displayed on the display panel 216.

In the example illustrated in FIG. 14A, a screen for setting an audio input source of the AV amplifier 300 is displayed in an application display area 911 of the display panel 216. The user can change the audio input source of the AV amplifier 300 by operating the remote control 800. According to the related art, the audio input source of an AV amplifier can be changed using a remote control of a television receiver, but the information of the input selected by the AV amplifier is not displayed on the television receiver side, and thus operation on the screen of the television receiver is not performed. Also, due to such a constraint of operability, switching of the input of the AV amplifier is not actually performed using the remote control of the television receiver, and it is necessary for the user to change the setting of the AV amplifier by operating the remote control of the AV amplifier. In this embodiment, the user operates, using the remote control 800 of the television receiver 200, the screen displayed on the display panel 216 through execution of the audio device control application that is downloaded by the television receiver 200 from the application server 12 as necessary, whereby a process unique to the AV amplifier 300 can be controlled from the television receiver 200.

Figure 14B:
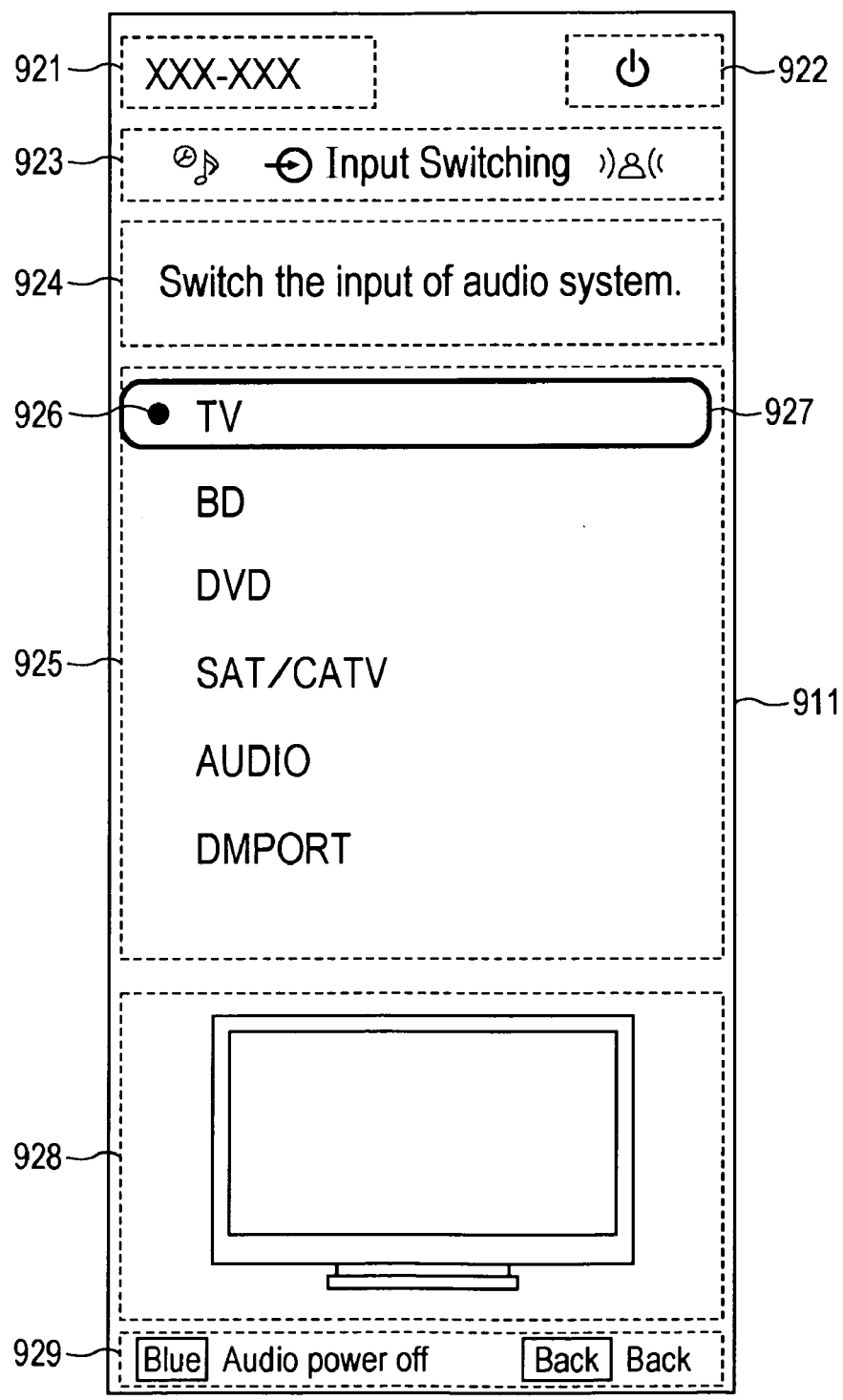
FIG. 14B is an explanatory view illustrating an example of a screen displayed on the display panel.

FIG. 14B is a diagram illustrating individual parts of a screen of the audio device control application displayed in the application display area 911 illustrated in FIG. 14A. The broken lines in FIG. 14B are given for convenience, and are not displayed actually.

An area 921 is used for displaying the model name (or model number) of the AV amplifier 300. The television receiver 200 inquires the model name (or model number) of the AV amplifier 300, which is to be displayed in the area 921, to the AV amplifier 300, and the AV amplifier 300 notifies the television receiver 200 of the model name (or model number). An area 922 is used for displaying a button for turning off the power of the AV amplifier 300. A user moves a cursor to the button and presses the set button 811 by operating the remote control 800, whereby the CPU 231 detects that the operation of turning off the power of the AV amplifier 300 has been performed and transmits a command for turning off the power to the AV amplifier 300. Accordingly, the power of the AV amplifier 300 can be turned off. An area 923 is used for displaying a tab for specifying the setting of an object to be changed of the AV amplifier 300. In this embodiment, the audio input source of the AV amplifier 300, the sound field of the AV amplifier 300, and the sound quality of the AV amplifier 300 can be changed using the audio device control application. An area 924 is used for displaying a caption of a selected tab.

An area 925 is used for displaying information about audio input sources of the AV amplifier 300. The television receiver 200 inquires the audio input sources of the AV amplifier 300, which are to be displayed in the area 925, to the AV amplifier 300, and the AV amplifier 300 notifies the television receiver 200 of the audio input sources. The user can select one of the audio input sources displayed in the area 925 by operating the remote control 800. An icon 926 indicates the current audio input source of the AV amplifier 300. A cursor 927 indicates the currently focused item.

An area 928 is used for displaying an image corresponding to the audio input source of the AV amplifier 300 that is currently focused by the cursor 927. In FIG. 14B, "TV" is currently focused on, and thus an image related to a television receiver is displayed in the area 928. An area 929 is used for showing an operation guide of the remote control 800. In FIG. 14B, the area 929 shows that the power of the audio device (AV amplifier 300) can be turned off by pressing a blue button of the remote control 800 and that the preceding screen, that is, the screen of the normal mode, can be displayed by pressing the back button 814 of the remote control 800.

Figure 15:
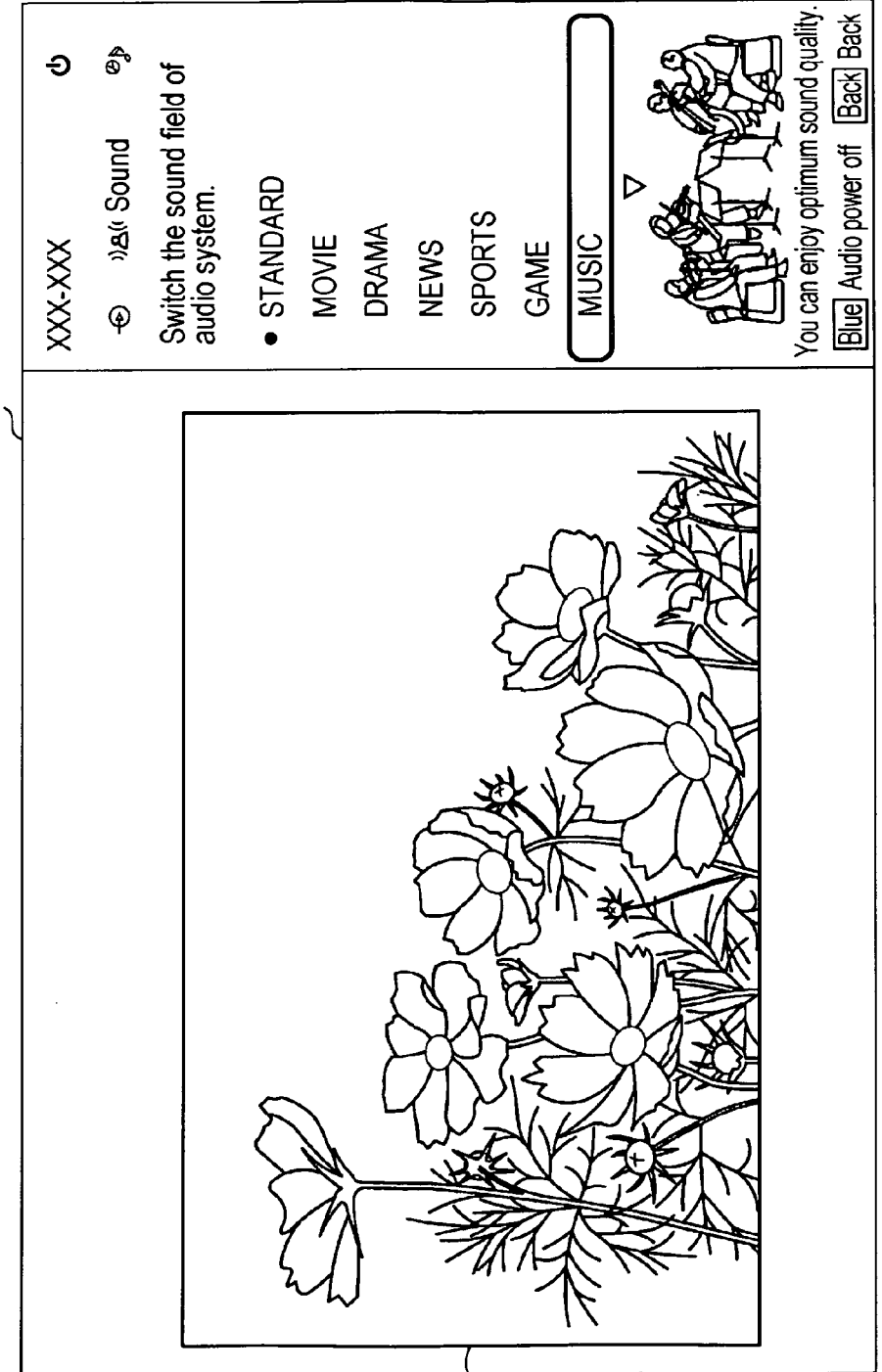
FIG. 15 is an explanatory view illustrating an example of a screen displayed on the display panel.

FIG. 15 is a diagram illustrating another example of the screen displayed on the display panel 216 in a case where the audio device control application is in the active mode. In the example illustrated in FIG. 15, a screen for setting the sound field of the AV amplifier 300 is displayed in the application display area 911 of the display panel 216. The user can set the sound field of the AV amplifier 300 by operating the remote control 800.

When the user presses the left button 812c or the right button 812d of the remote control 800, the screen for setting the sound field of the AV amplifier 300 illustrated in FIG. 15 can be displayed on the display panel 216.

Figure 16:
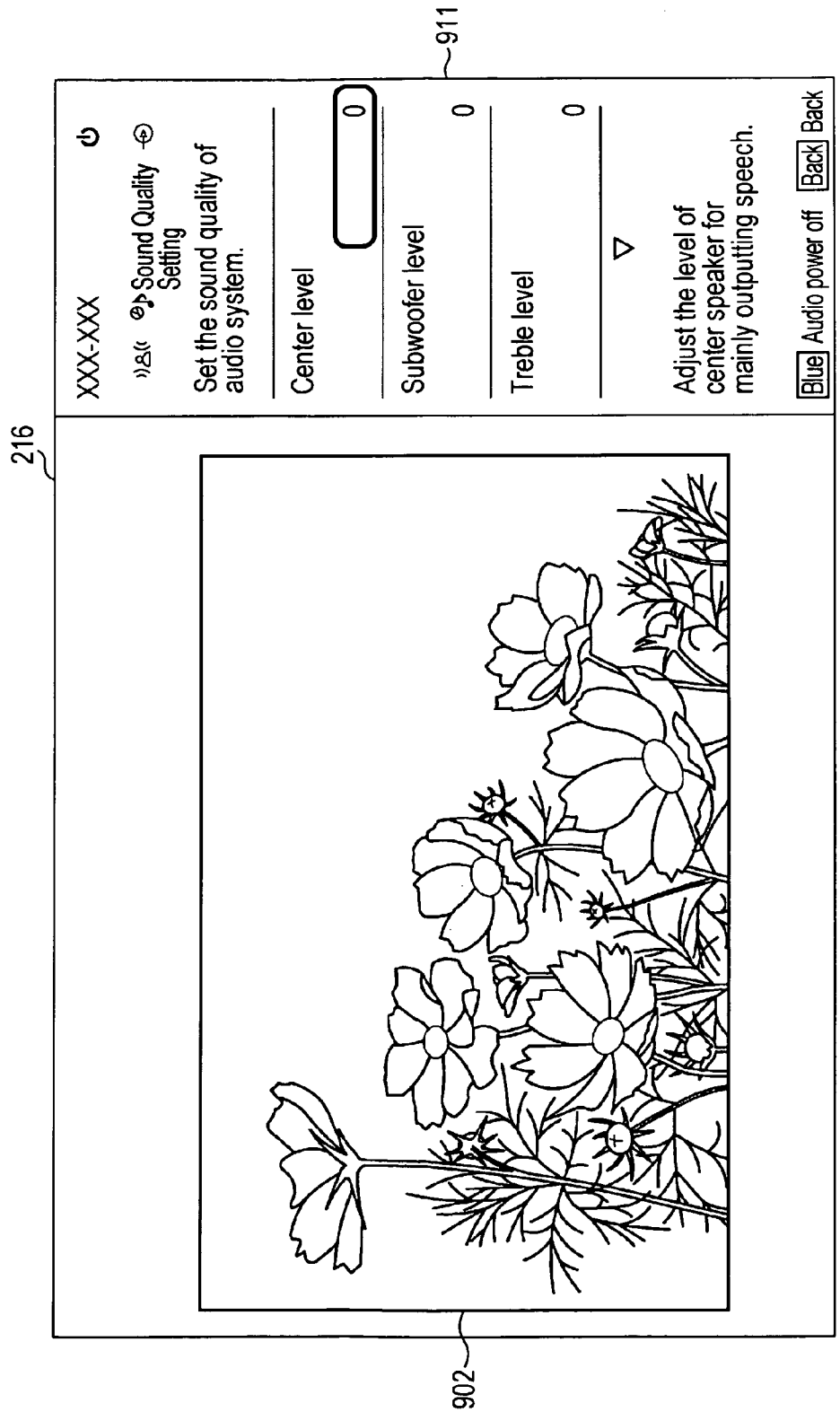
FIG. 16 is an explanatory view illustrating an example of a screen displayed on the display panel.

FIG. 16 is a diagram illustrating another example of the screen displayed on the display panel 216 in a case where the audio device control application is in the active mode. In the example illustrated in FIG. 16, a screen for setting the quality of sound output from the AV amplifier 300 is displayed in the application display area 911 of the display panel 216. The user can set the quality of sound output from the AV amplifier 300 by operating the remote control 800. In order to cause the display panel 216 to display the screen for setting the quality of sound output from the AV amplifier 300, the user presses the left button 812c or the right button 812d of the remote control 800.

Figure 17:
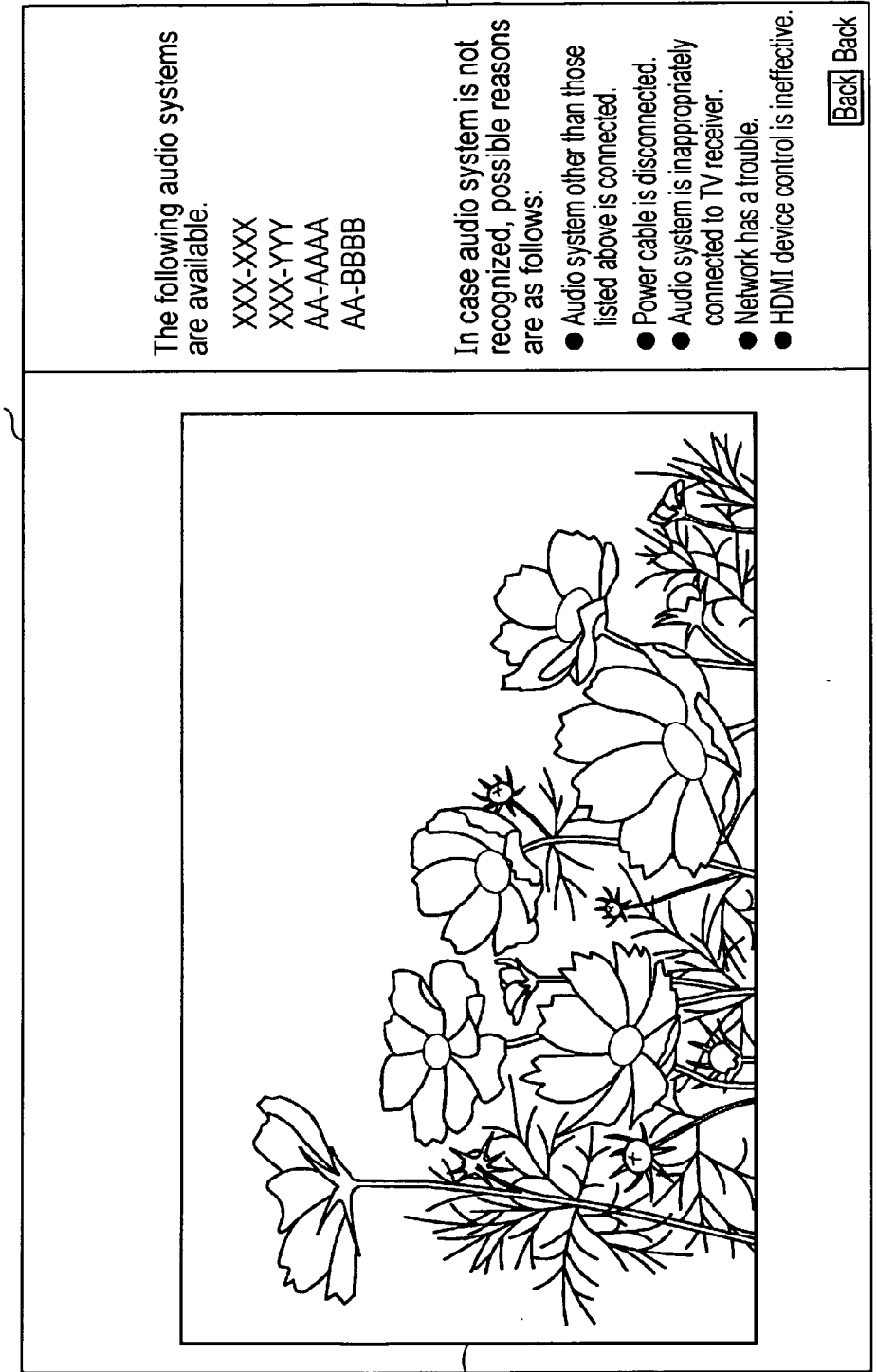
FIG. 17 is an explanatory view illustrating an example of a screen displayed on the display panel.

FIG. 17 is a diagram illustrating another example of the screen displayed on the display panel 216 in a case where the audio device control application is in the active mode. FIG. 17 illustrates an example of the screen displayed in the application display area 911 of the display panel 216 in a case where the AV amplifier 300 connected to the television receiver 200 via the HDMI cable 701 is not controlled by the audio device control application. Such display is performed under control by the CPU 231 in a case where the connection of the AV amplifier 300 is not determined after the audio device control application is started in the television receiver 200 or where the model of the connected AV amplifier 300 is a model that is not controlled by the audio device control application even if the connection is determined. Displaying the screen illustrated in FIG. 17 on the display panel 216 causes the user to recognize that the AV amplifier 300 connected to the television receiver 200 via the HDMI cable 701 is not controlled by the audio device control application.

Figure 18:
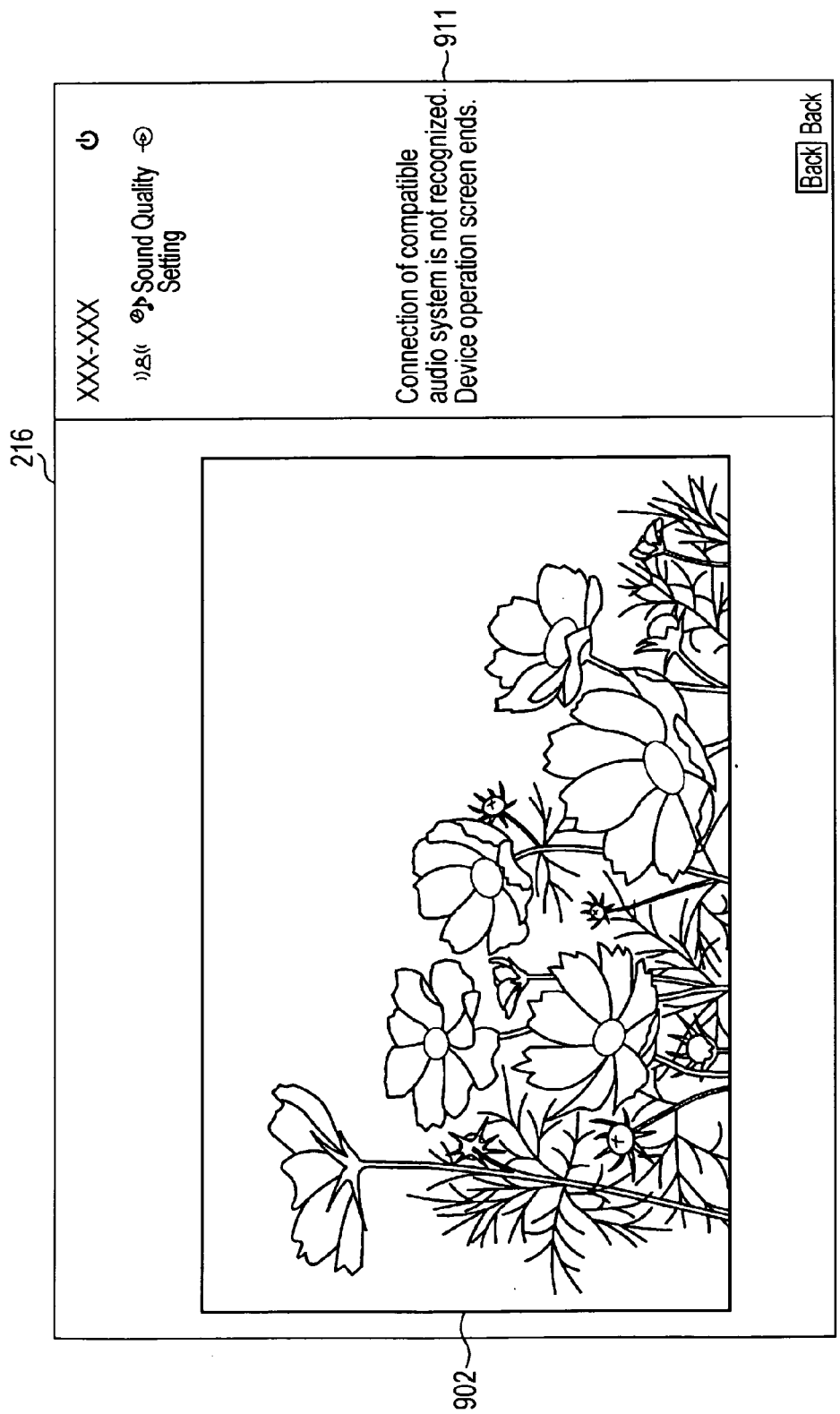
FIG. 18 is an explanatory view illustrating an example of a screen displayed on the display panel.

FIG. 18 is a diagram illustrating another example of the screen displayed on the display panel 216 in a case where the audio device control application is in the active mode. FIG. 18 illustrates an example of the screen displayed in the application display area 911 of the display panel 216 when the HDMI cable 701 that connects the television receiver 200 and the AV amplifier 300 is disconnected from the television receiver 200 or the AV amplifier 300 and when the connection of the AV amplifier 300 is not recognized by the television receiver 200 in a case where the audio device control application is in the active mode. In this case, the audio device control application automatically changes to the normal mode after a predetermined time has elapsed since the screen illustrated in FIG. 18 was displayed in the application display area 911 of the display panel 216. When the audio device control application is in the active mode, if the power of the AV amplifier 300 connected to the television receiver 200 via the HDMI cable 701 is turned off regardless of the audio device control application (that is, if the power of the AV amplifier 300 is directly turned off), a screen different from that illustrated in FIG. 18 may be displayed in the application display area 911 of the display panel 216.

Figure 19:
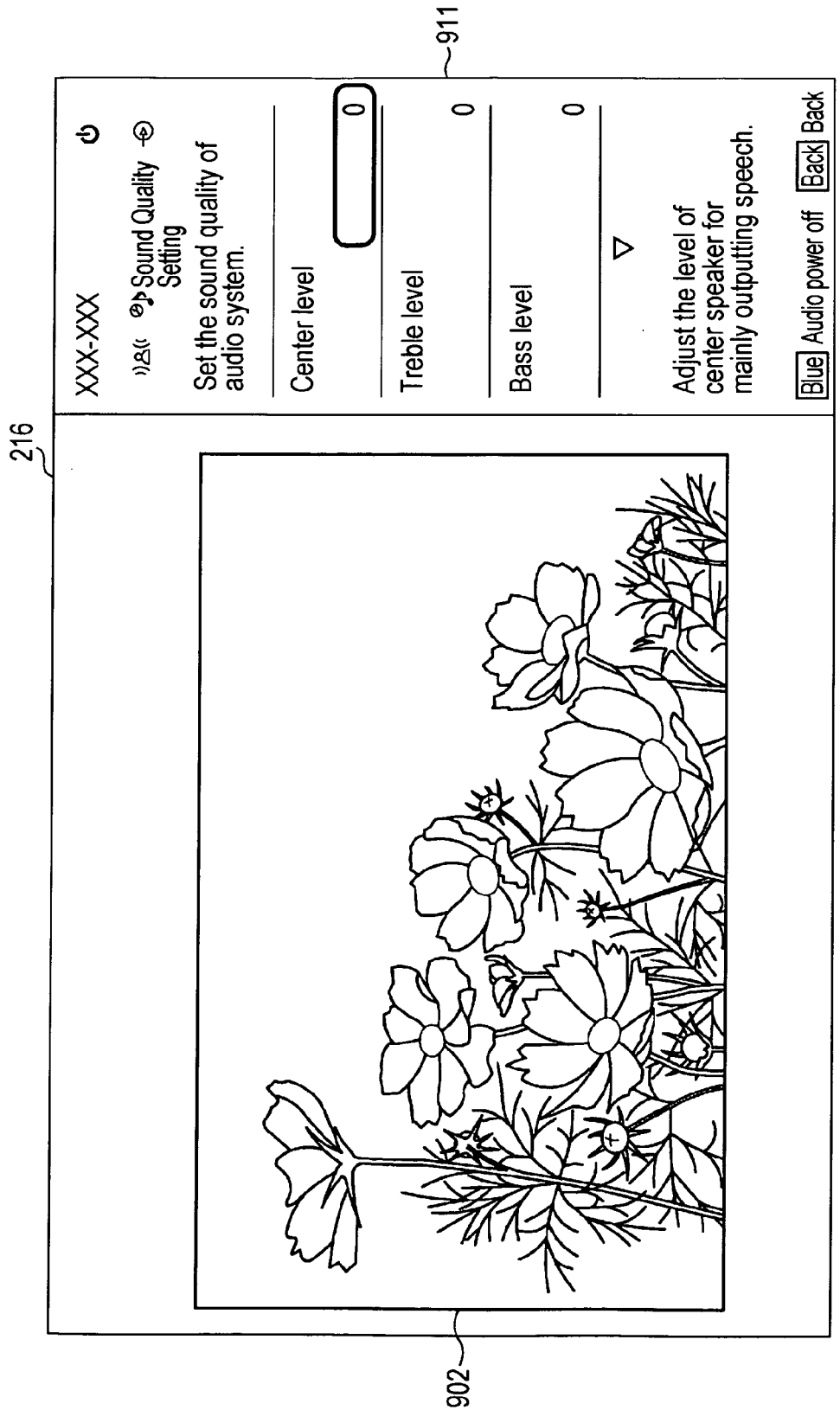
FIG. 19 is an explanatory view illustrating an example of a screen displayed on the display panel.

The audio device control application is capable of displaying different screens in accordance with the status of the AV amplifier 300 connected to the television receiver 200 via the HDMI cable 701. FIG. 19 is a diagram illustrating another example of the screen displayed on the display panel 216 in a case where the audio device control application is in the active mode. In FIG. 19, as in FIG. 16, the screen for setting the quality of sound output from the AV amplifier 300 is displayed in the application display area 911 of the display panel 216. However, in FIG. 19, the setting items are different from those illustrated in FIG. 16. In this way, the audio device control application performed by the CPU 231 is capable of displaying different screens in accordance with the model and status of the AV amplifier 300 connected to the television receiver 200.

A description has been given above about the content of the screen displayed on the display panel 216 when the television receiver 200 performs the application provided from the application server 12 as necessary. Next, the operations of the television receiver 200 and the AV amplifier 300 will be described with reference to the drawings.

Figure 20:
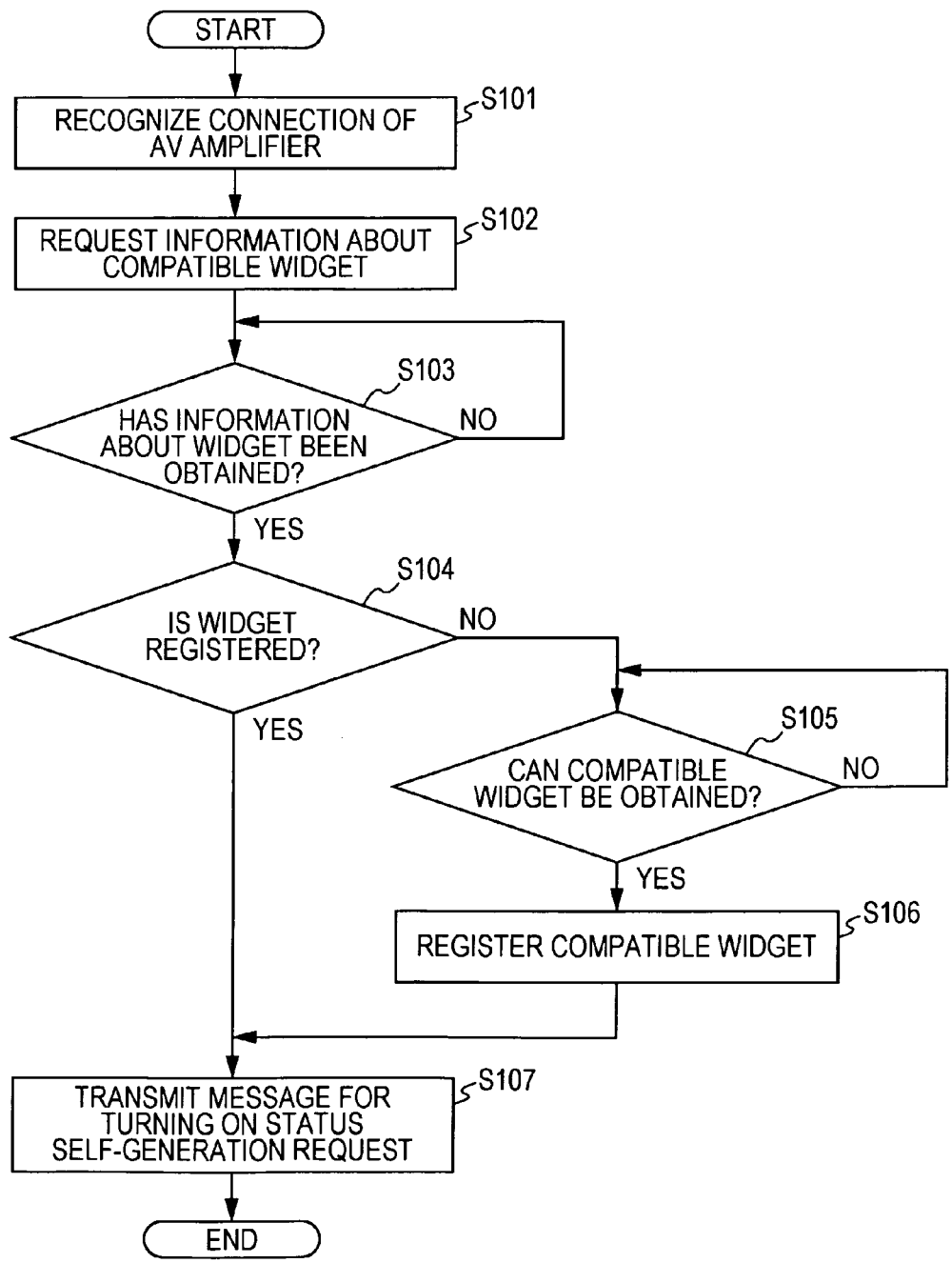
FIG. 20 is a flowchart illustrating an operation example of the television receiver according to an embodiment of the present invention.

FIG. 20 is a flowchart illustrating the operation of the television receiver 200 in a case where the AV amplifier 300 is connected to the television receiver 200 via the HDMI cable 701. FIG. 20 illustrates the operation that is performed when the HDMI device control of the television receiver 200 (control on a device directly or indirectly connected to the television receiver 200 via an HDMI cable, performed by the television receiver 200) is effective.

When the AV amplifier 300 is connected to the television receiver 200 via the HDMI cable 701, the television receiver 200 can recognize the connection of the AV amplifier 300 (step S101). Specifically, when the AV amplifier 300 is connected to the television receiver 200 via the HDMI cable 701, an HPD terminal shifts from a low level to a high level, and the HDMI receiving unit 307 of the AV amplifier 300 obtains a physical address and also obtains a logical address through a polling operation. At this time, the AV amplifier 300 broadcasts a report physical address using the logical address 5, so as to notify the CEC-compatible device connected thereto via an HDMI cable of its existence. The television receiver 200 recognizes the existence of the AV amplifier 300 through the report physical address transmitted from the logical address of the AV amplifier 300 or through the polling that is regularly performed by the television receiver 200. In this way, the television receiver 200 recognizes the connection of the AV amplifier 300.

After the television receiver 200 recognizes the connection of the AV amplifier 300 in step S101, the television receiver 200 requests information about the audio device control application (hereinafter also referred to as "widget") with which the AV amplifier 300 is compatible to the AV amplifier 300 in order to determine whether the AV amplifier 300 connected to the television receiver 200 can be controlled by the audio device control application (step S102). The television receiver 200 waits for a predetermined time period until receiving a response showing the information about the compatible widget from the AV amplifier 300 (step S103). On the basis of the response from the AV amplifier 300, the television receiver 200 can determine whether the model of the AV amplifier 300 connected thereto is compatible with the widget or determine the compatible widget. When receiving the response showing the information about the compatible widget from the AV amplifier 300, the television receiver 200 determines whether the compatible widget shown in the response from the AV amplifier 300 is registered in the application list of the television receiver 200 (step S104).

As a result of the determination made in step S104, if the compatible widget shown in the response from the AV amplifier 300 is not registered in the application list of the television receiver 200, the television receiver 200 accesses the application server 12 and waits until the compatible widget can be obtained (step S105). When the compatible widget can be obtained from the application server 12, the television receiver 200 registers the compatible widget in the application list (step S106).

After the compatible widget of the AV amplifier 300 has been registered in the application list of the television receiver 200, the television receiver 200 transmits a message for turning on a status self-generation request to the AV amplifier 300 (step S107). After receiving the message, the AV amplifier 300 can self-generate the status corresponding to the widget, and continues the self-generation of the status until receiving a message for turning off the status self-generation request from the television receiver 200.

In order to deal with the application for controlling the operation of the AV amplifier 300 from the television receiver 200, it is necessary to notify the television receiver 200 of the current status from the AV amplifier 300. In that case, the load of traffic may increase due to issue of many vendor-specific commands by the AV amplifier 300. Then, according to this embodiment, the television receiver 200 makes a setting, when starting the execution of the audio device control application, so that the AV amplifier 300 self-generates a status, and also makes a setting, when ending the execution, so that the AV amplifier 300 does not self-generate a status. Accordingly, an increase in traffic volume between the television receiver 200 and the AV amplifier 300 can be suppressed, and the load of traffic can be reduced.

A user can operate the widget registered in the television receiver 200 at arbitrary timing. However, in ordinary cases, it is not the entire period when the television receiver 200 is used that the AV amplifier 300 is operated. In a case where devices compatible with the widget are mutually connected and where the AV amplifier 300 is operated, it is necessary to notify the widget of the correct status of the AV amplifier 300. However, the notification is necessary only when the widget is activated. If the AV amplifier 300 self-generates a status in a constant manner, the traffic load of CEC may increase, the timing of an ordinary CEC operation may (slightly) delay, and the operability for the user may degrade. Thus, the AV amplifier 300 does not self-generate a status when it is unnecessary. Thus, the television receiver 200 transmits, to the AV amplifier 300, a message for turning on the status self-generation request and a message for turning off the status self-generation request at the start and end of the widget, respectively.

Figure 21:
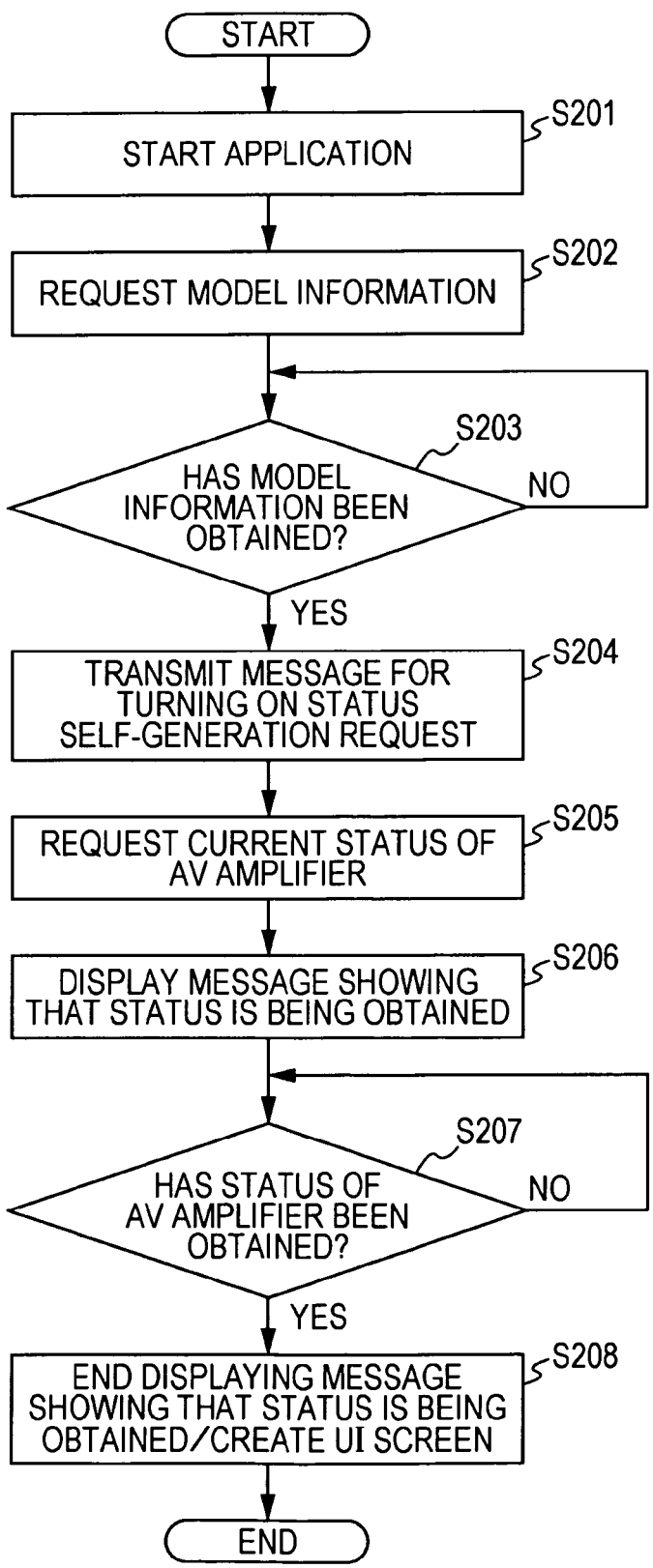
FIG. 21 is a flowchart illustrating an operation example of the television receiver according to an embodiment of the present invention.

FIG. 21 is a flowchart illustrating the operation of the television receiver 200 in a case where the television receiver 200 performs the audio device control application. The audio device control application can be performed by the television receiver 200 from the initial screen illustrated in FIG. 11, for example.

When the television receiver 200 starts the audio device control application that is provided from the application server 12 as necessary (step S201), the television receiver 200 requests model information of the AV amplifier 300 to the AV amplifier 300 using a function of the audio device control application (step S202). The model information of the AV amplifier 300 includes information about the model of the AV amplifier 300, information about the sale destination of the AV amplifier 300, and the like. The television receiver 200 waits for a predetermined time period until receiving a response showing the model information of the AV amplifier 300 from the AV amplifier 300 (step S203).

When receiving a response showing the model information of the AV amplifier 300 from the AV amplifier 300, the television receiver 200 transmits a message for turning on the status self-generation request to the AV amplifier 300 (step S204). This is the same operation as that in the foregoing step S107. The process illustrated in FIG. 21 that is performed by the television receiver 200 may be continued from the process illustrated in FIG. 20. However, the audio device control application can be performed at arbitrary timing, and thus the television receiver 200 transmits the message for turning on the status self-generation request to the AV amplifier 300 also at this time.

After transmitting the message for turning on the status self-generation request in step S204, the television receiver 200 requests a response showing the current status to the AV amplifier 300 (step S205). The AV amplifier 300 notifies the television receiver 200 of the current status in the status notification process described below. Until receiving a response from the AV amplifier 300, the television receiver 200 may perform a process of displaying a message showing that the status of the AV amplifier 300 is being obtained on the display panel 216 by using the audio device control application (step S206).

The television receiver 200 waits for a predetermined time period until receiving a response showing the current status of the AV amplifier 300 from the AV amplifier 300 (step S207). When receiving the response showing the current status of the AV amplifier 300 from the AV amplifier 300, if the audio device control application is performing display of the message showing that the status of the AV amplifier 300 is being obtained, the television receiver 200 stops the display, and performs display of an appropriate user interface using the audio device control application on the basis of the model of the AV amplifier 300 and the current status of the AV amplifier 300 notified from the AV amplifier 300 (step S208).

Figure 22:
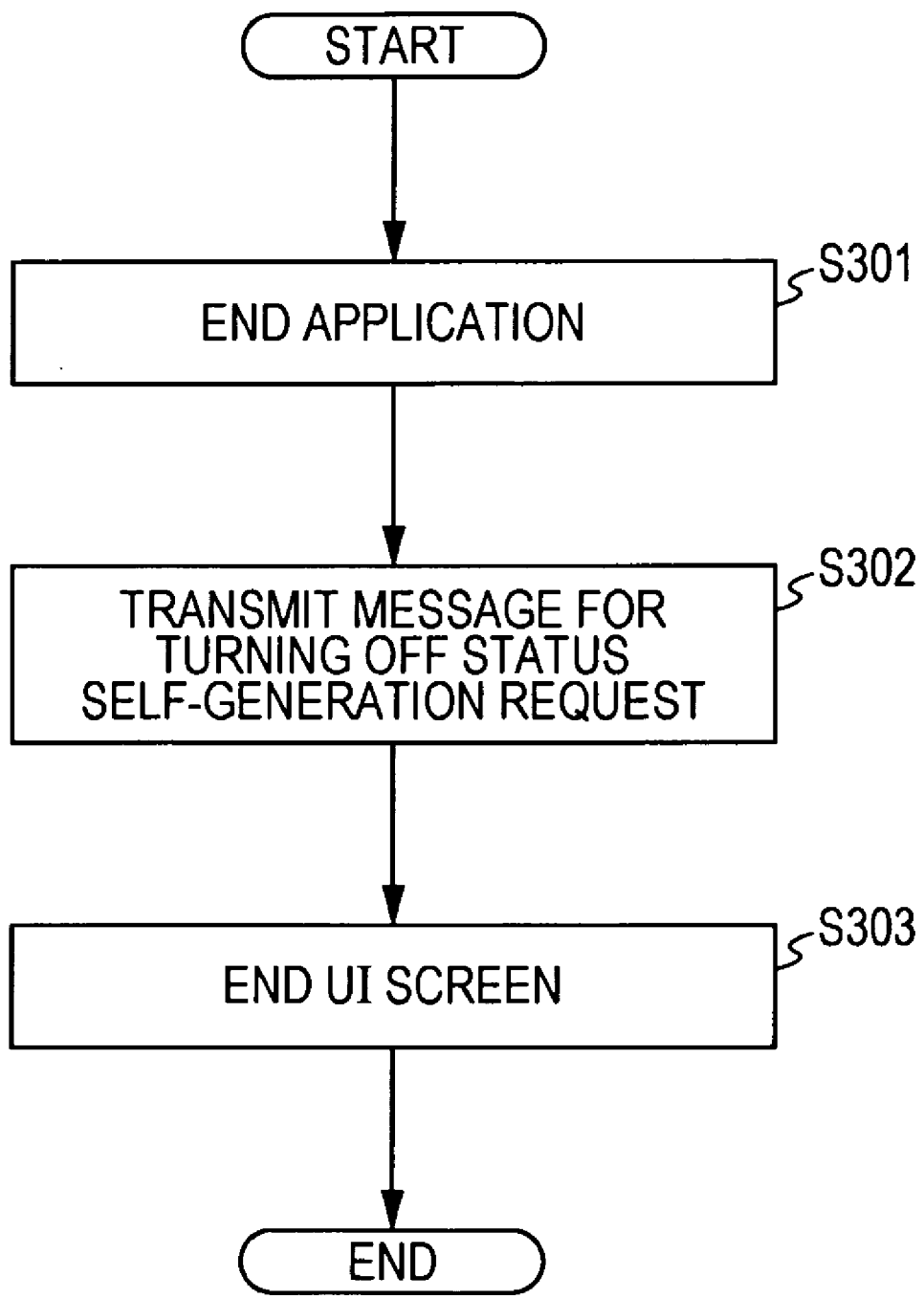
FIG. 22 is a flowchart illustrating an operation example of the television receiver according to an embodiment of the present invention.

FIG. 22 is a flowchart illustrating the operation of the television receiver 200 in a case where the television receiver 200 ends the execution of the audio device control application.

When ending the execution of the audio device control application (step S301), the television receiver 200 transmits a message for turning off the status self-generation request to the AV amplifier 300 (step S302). With the transmission of this message to the AV amplifier 300, self-generation of a status by the AV amplifier 300 is stopped, and the traffic load of CEC can be reduced.

In accordance with the end of the execution of the audio device control application, display of the user interface screen performed by the audio device control application is stopped (step S303), and the initial screen illustrated in FIG. 11 is displayed on the display panel 216 of the television receiver 200.

Figure 23:
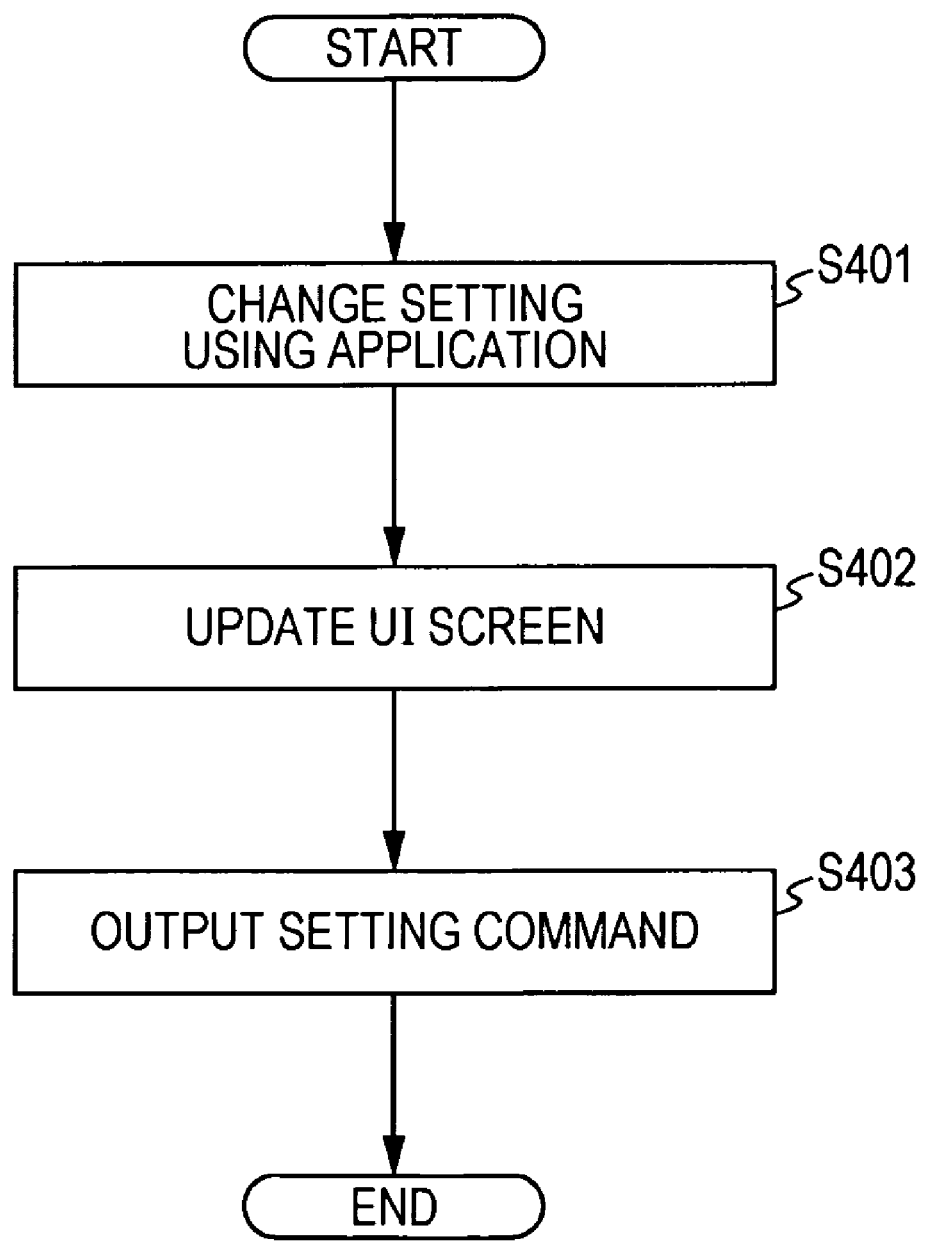
FIG. 23 is a flowchart illustrating an operation example of the television receiver according to an embodiment of the present invention.

FIG. 23 is a flowchart illustrating the operation of the television receiver 200 in a case where the television receiver 200 changes the setting of the AV amplifier 300 using the audio device control application.

When the setting of the AV amplifier 300 is to be changed by the television receiver 200 using the audio device control application (step S401), the user interface screen that is displayed on the display panel 216 by the audio device control application is updated on the basis of a user operation of the remote control 800 (step S402). Then, the television receiver 200 transmits, at the same time as the update of the user interface screen, a command for changing the setting in accordance with the user interface screen to the AV amplifier 300 (step S403). The AV amplifier 300 that has received the command from the television receiver 200 changes the setting in accordance with the command.

Figure 24:
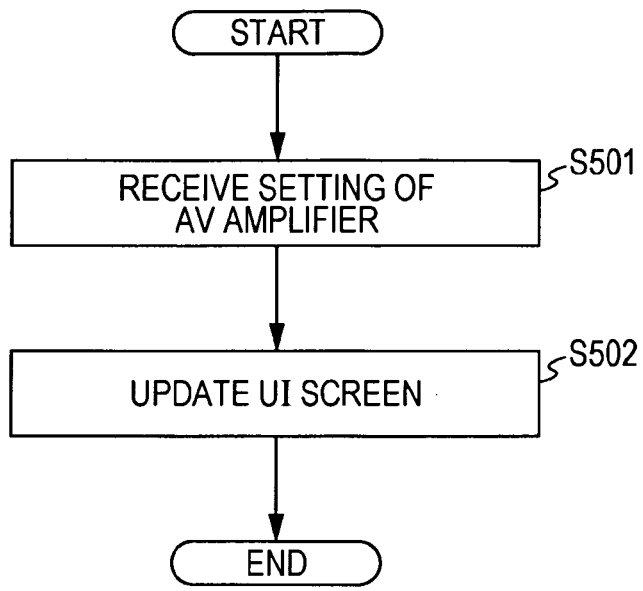
FIG. 24 is a flowchart illustrating an operation example of the television receiver according to an embodiment of the present invention.

The setting of the AV amplifier 300 can be changed via the audio device control application, or directly. In a case where the setting of the AV amplifier 300 is directly changed, it is desirable to transmit the changed setting from the AV amplifier 300 to the television receiver 200 and update the display of the screen. FIG. 24 is a flowchart illustrating the operation of the television receiver 200 for receiving the setting of the AV amplifier 300 while the television receiver 200 is performing the audio device control application.

When the television receiver 200 receives the setting of the AV amplifier 300 (step S501), the audio device control application updates the user interface screen displayed on the display panel 216 on the basis of the setting of the AV amplifier 300 (step S502). With such update of the display, the setting of the AV amplifier 300 can be checked in the television receiver 200 even if the setting of the AV amplifier 300 is directly changed.

Figure 25:
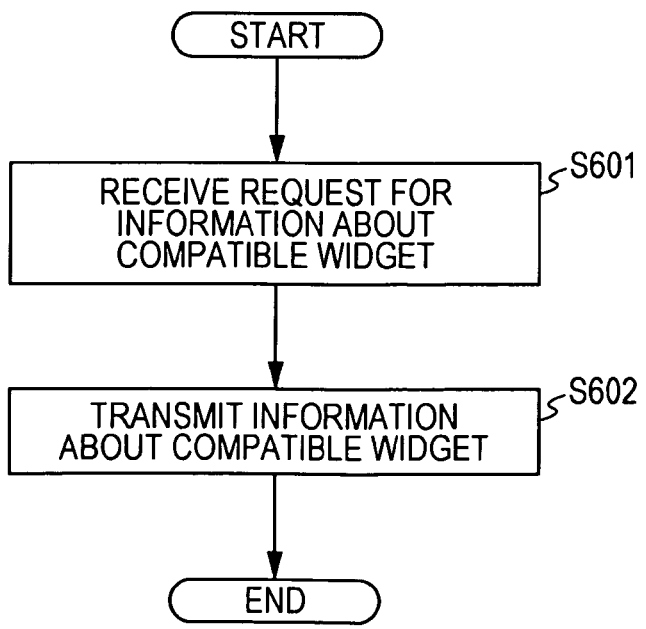
FIG. 25 is a flowchart illustrating an operation example of the AV amplifier according to an embodiment of the present invention.

FIG. 25 is a flowchart illustrating a process that is performed when the AV amplifier 300 receives a request for information about a compatible widget from the television receiver 200, that is, a process performed by the AV amplifier 300 after the television receiver 200 has performed step S102 in FIG. 20.

When receiving a request for information about the compatible widget from the television receiver 200 (step S601), the AV amplifier 300 transmits the information about the compatible widget stored in the AV amplifier 300 to the television receiver 200 (step S602). By receiving the information about the compatible widget from the AV amplifier 300, the television receiver 200 can download the widget suitable for controlling the AV amplifier 300 from the application server 12.

Figure 26:
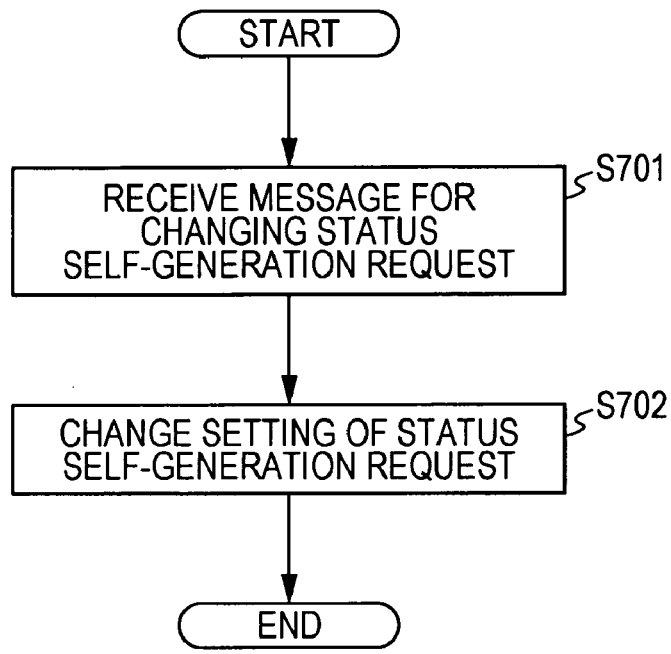
FIG. 26 is a flowchart illustrating an operation example of the AV amplifier according to an embodiment of the present invention.

FIG. 26 is a flowchart illustrating a process that is performed when the AV amplifier 300 receives a message for changing the status self-generation request from the television receiver 200, that is, a process performed by the AV amplifier 300 after the television receiver 200 has performed step S107 in FIG. 20, step S204 in FIG. 21, and step S302 in FIG. 22.

When receiving a message for changing the status self-generation request from the television receiver 200 (step S701), the AV amplifier 300 changes the setting of the status self-generation request on the basis of the received message (step S702). That is, the television receiver 200 performs step S107 in FIG. 20 and step S204 in FIG. 21 in order to transmit a message for turning on the status self-generation request to the AV amplifier 300, and then the AV amplifier 300 turns on the state of the status self-generation. On the other hand, the television receiver 200 performs step S302 in FIG. 22 in order to transmit a message for turning off the status self-generation request to the AV amplifier 300, and then the AV amplifier 300 turns off the state of the status self-generation.

In this way, by receiving a message for changing the status self-generation request from the television receiver 200, the AV amplifier 300 self-generates a status only when the status self-generation request is on. Accordingly, the traffic load of CEC can be reduced.

Figure 27:
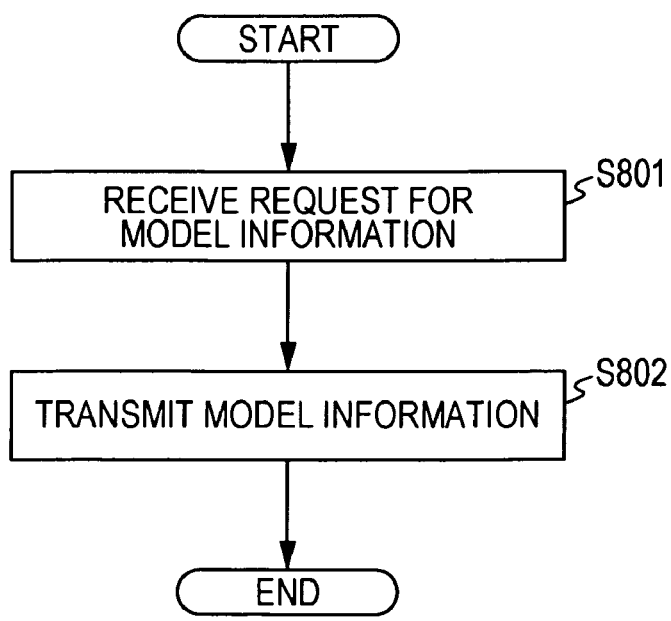
FIG. 27 is a flowchart illustrating an operation example of the AV amplifier according to an embodiment of the present invention.

FIG. 27 is a flowchart illustrating a process that is performed when the AV amplifier 300 receives a request for model information from the television receiver 200, that is, a process performed by the AV amplifier 300 after the television receiver 200 has performed step S202 in FIG. 21.

When receiving a request for model information from the television receiver 200 (step S801), the AV amplifier 300 transmits its model information to the television receiver 200 on the basis of the received request (step S802). Alternatively, the AV amplifier 300 may transmit information about a model ID that uniquely specifies the model to the television receiver 200, together with the model information. On the basis of the model information received from the AV amplifier 300, the television receiver 200 can dynamically change the operation of the widget downloaded from the application server 12 so that operations can be performed according to models. For example, the widget operated in the television receiver 200 can display the model name of the AV amplifier 300 connected to the television receiver 200 on the display panel 216 by using the model information transmitted from the AV amplifier 300.

Figure 28:
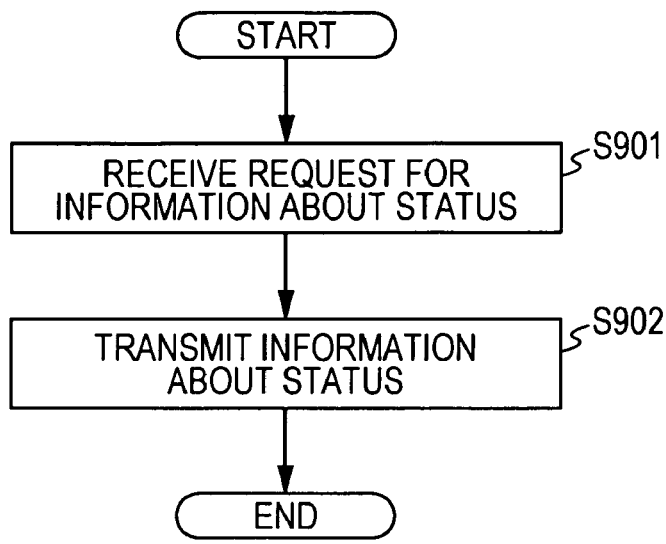
FIG. 28 is a flowchart illustrating an operation example of the AV amplifier according to an embodiment of the present invention.

FIG. 28 is a flowchart illustrating a process of transmitting information about a status that is performed when the AV amplifier 300 receives a request for information about a current status from the television receiver 200, that is, a process performed by the AV amplifier 300 after the television receiver 200 has performed step S205 in FIG. 21.

When receiving a request for information about a current status from the television receiver 200 (step S901), the AV amplifier 300 transmits the information about its current status to the television receiver 200 on the basis of the received request (step S902). The information about the current status transmitted by the AV amplifier 300 may include information about a current audio input source, current setting of the sound field, and current setting of the sound quality. With the transmission of the information about the current status from the AV amplifier 300 to the television receiver 200, the widget that operates in the television receiver 200 can display the information about the current status of the AV amplifier 300 on the display panel 216.

Figure 29:
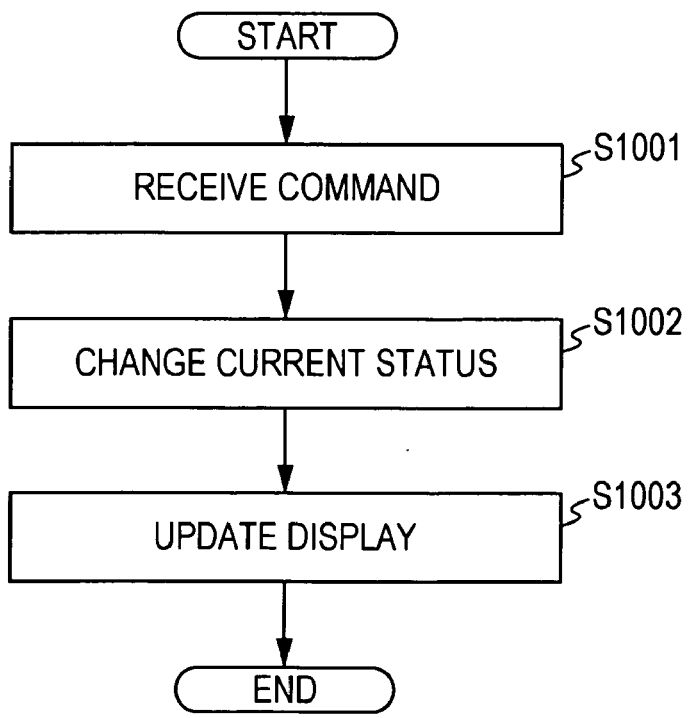
FIG. 29 is a flowchart illustrating an operation example of the AV amplifier according to an embodiment of the present invention.

FIG. 29 is a flowchart illustrating a process that is performed when the AV amplifier 300 receives a command for changing a current status from the television receiver 200, that is, a process performed by the AV amplifier 300 after the television receiver 200 has performed step S403 in FIG. 23.

When receiving a command for changing the current status from the television receiver 200 (step S1001), the AV amplifier 300 changes the current status on the basis of the received command (step S1002). After changing the current status, the AV amplifier 300 changes the display on the display unit 325 as necessary (step S1003). Accordingly, the status of the AV amplifier 300 can be changed on the basis of the command transmitted from the widget operated in the television receiver 200.

Figure 30:
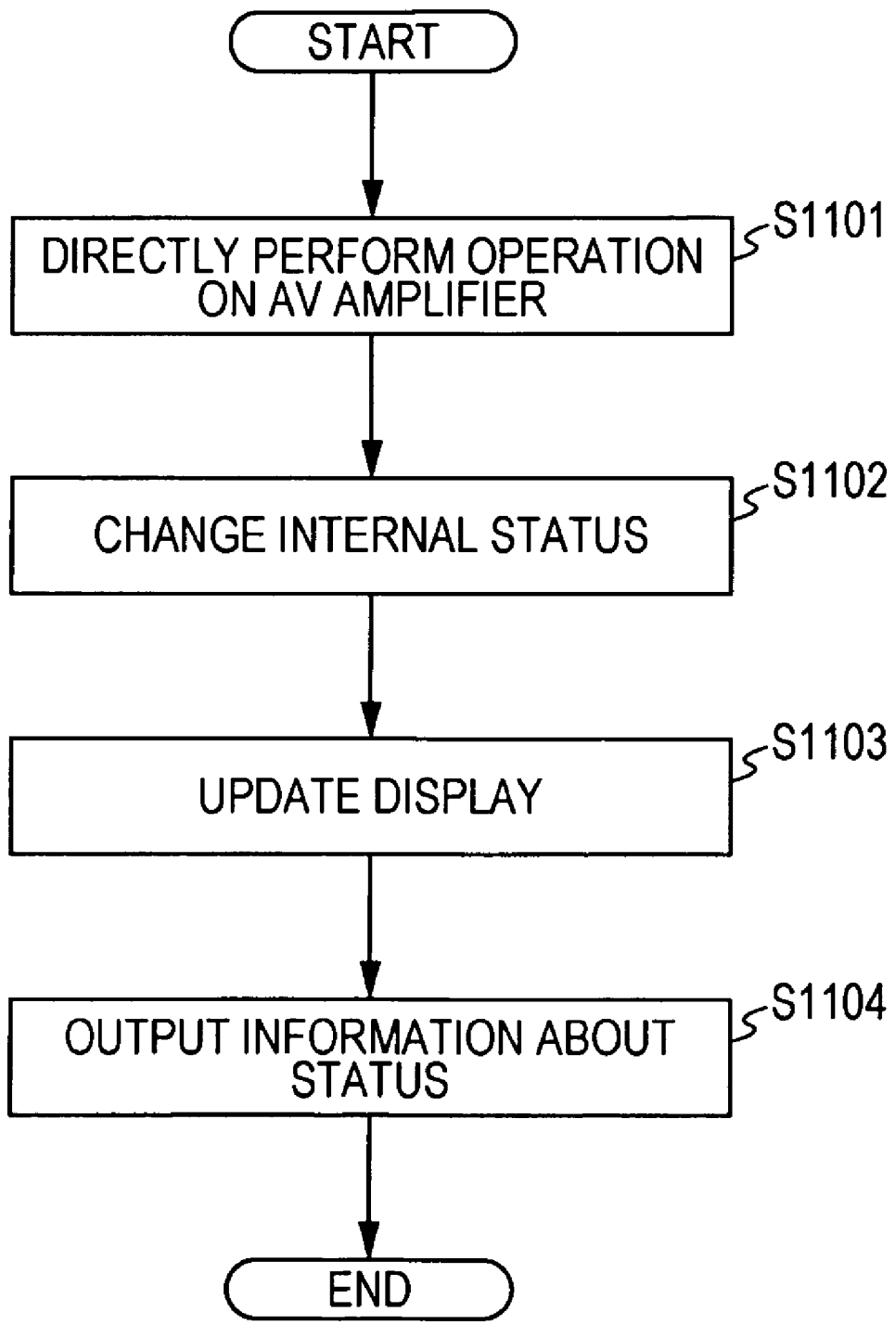
FIG. 30 is a flowchart illustrating an operation example of the AV amplifier according to an embodiment of the present invention.

FIG. 30 is a flowchart illustrating a process that is performed in a case where an operation is directly performed on the AV amplifier 300, not from the television receiver 200, and where the current status of the AV amplifier 300 is changed.

When an operation is directly performed on the AV amplifier 300 (step S1101) and the current status of the AV amplifier 300 is changed (step S1102), the display on the display unit 325 is changed as necessary (step S1103). Then, if the status self-generation request is turned on, information about the changed status is transmitted to the television receiver 200 (step S1104).

In this way, if an operation is directly performed on the AV amplifier 300 and if the current status of the AV amplifier 300 is changed, information about the changed status is transmitted to the television receiver 200. Accordingly, the widget operating in the television receiver 200 can change the display on the display panel 216. For example, even if the setting of the audio input source or the sound field is changed using the remote control of the AV amplifier 300 while the widget is operating in the television receiver 200, the content after change can be displayed on the display panel 216.

A description has been given above about the operations of the television receiver 200 and the AV amplifier 300 with reference to the drawings. Next, examples of a command transmitted/received between the television receiver 200 and the AV amplifier 300 will be described.

In this embodiment, a vendor-specific command that is defined by each vendor is used as the command transmitted/received between the television receiver 200 and the AV amplifier 300.

Figure 31:
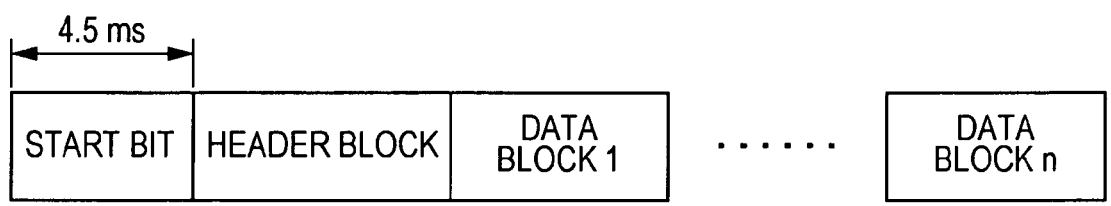
FIG. 31 is a diagram illustrating a block structure of data transmitted through a CEC line or a CEC channel.
Figure 32:
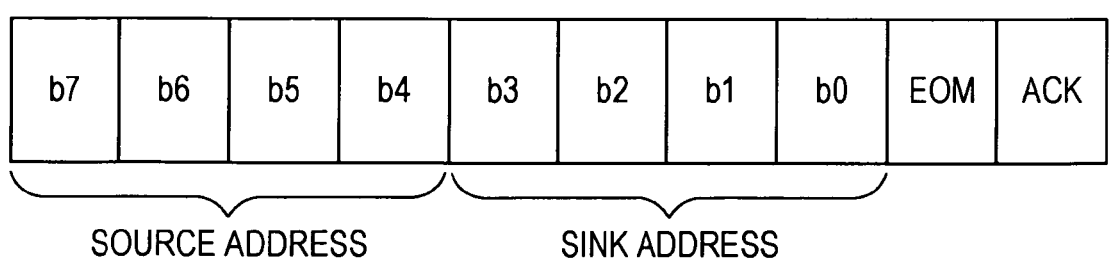
FIG. 32 is a diagram illustrating an example of a data structure of a header block.

FIG. 31 illustrates a block structure of data that is transmitted through a CEC line (CEC channel). The CEC line has a configuration in which one block is transmitted in 4.5 milliseconds. A start bit is disposed at the start of data transmission, which is followed by a header block and an arbitrary number (n) of data blocks containing the data that is to be actually transmitted. FIG. 32 illustrates an example of a data structure of the header block. The header block includes a logical address of a source (source address) and a logical address of a sink (sink address).

Typically, a CEC message has a configuration in which a maximum of sixteen pieces of ten-bit data are coupled.

Among the ten bits, the last two bits include an end-of-message (EOM) bit representing the last bit and an acknowledgement (ACK) bit representing that it is recognized, as illustrated in FIG. 32. Therefore, among the ten bits, the first eight bits are regarded as one byte in the following description.

The first one byte of a CEC command is composed of four bits that store a logical address of the source of the command and four bits that store a logical address of the sink of the command. As illustrated in FIG. 2, "0" is typically specified as a logical address of a television receiver, and "5" is typically specified as a logical address of an AV amplifier. As a method for transmitting a command, broadcast or unicast is available. In the broadcast, a command is transmitted from one device to all devices. In the unicast, a command is transmitted from one device to a device having a specific logical address.

Figure 33:
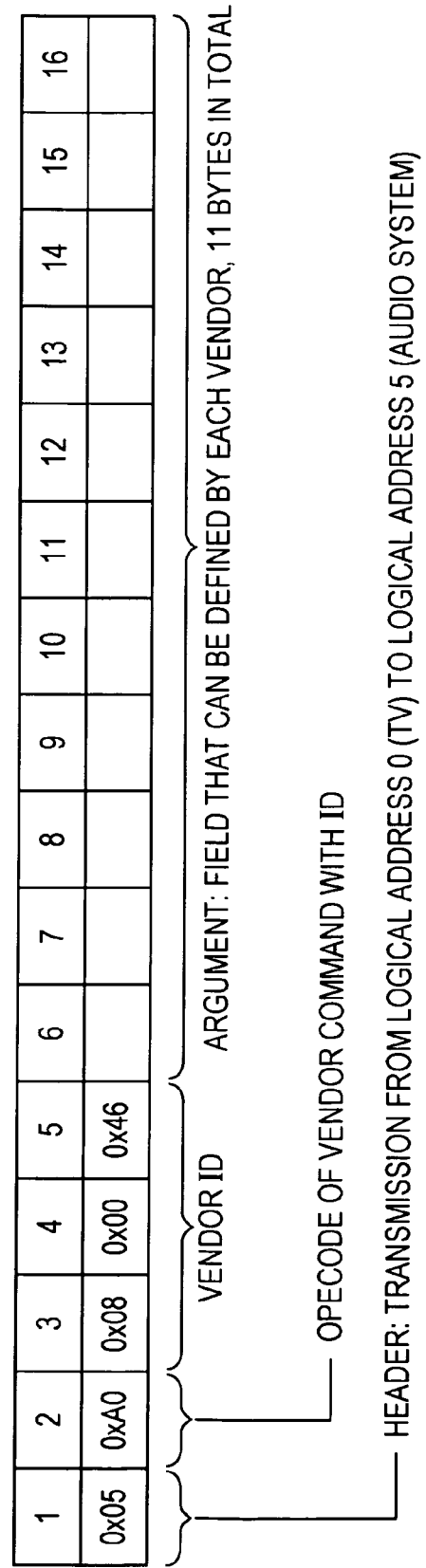
FIG. 33 is a diagram illustrating a data example of a command.

FIG. 33 is an explanatory view illustrating a data structure of a command (vendor-specific command, hereinafter simply referred to as command) that is transmitted/received between the television receiver 200 and the AV amplifier 300.

The first byte stores the source and sink of the command, as described above. In the example illustrated in FIG. 33, the first byte represents that the command is transmitted from the device having the logical address 0 (i.e., television receiver 200) to the device having the logical address 5 (i.e., AV amplifier 300).

The second byte represents opecode and shows that a vendor ID uniquely identifying the vendor is stored in the following three bytes. The vendor ID uniquely identifying the vendor is stored in the third to fifth bytes. The other bytes from the sixth byte serve as an area that can be used by each vendor with free definition. In this embodiment, the sixth and seventh bytes are used to store the opecode of the command, and the eighth to sixteenth bytes are used to store operand.

The command having such a data structure is transmitted/received between the television receiver 200 and the AV amplifier 300 mutually connected via the HDMI cable 701, whereby the AV amplifier 300 can be controlled from the television receiver 200 side, and information about current statuses can be transmitted from the AV amplifier 300 to the television receiver 200.

FIG. 34 is an explanatory view illustrating examples of the data structures of commands transmitted/received between the television receiver 200 and the AV amplifier 300. FIG. 34 illustrates examples of the data structures of a status request command transmitted from the television receiver 200 to the AV amplifier 300, a status notification command transmitted from AV amplifier 300 to the television receiver 200, and a status setting command transmitted from the television receiver 200 to the AV amplifier 300.

The examples of the data structures illustrated in FIG. 34 show the following. If the opecode defined in the sixth and seventh bytes of the command is "0x0000", the command is a command for requesting a current status from the television receiver 200 to the AV amplifier 300. If the opecode is "0x0001", the command is a command for notifying the television receiver 200 of a current status from the AV amplifier 300. If the opecode is "0x0002", the command is a setting command transmitted from the television receiver 200 to the AV amplifier 300.

Now, a description will be given of the data of each byte of the status notification command transmitted from the AV amplifier 300 to the television receiver 200 and the status setting command transmitted from the television receiver 200 to the AV amplifier 300 illustrated in FIG. 34. The eighth byte relates to the setting of the sound quality of the center speaker, and the ninth byte relates to the setting of the sound quality of the subwoofer. The tenth and eleventh bytes relate to the setting of the sound quality of the front-left speaker and the front-right speaker, respectively, and the twelfth and thirteenth bytes relate to the setting of the sound quality of the left surround speaker and the right surround speaker, respectively. The other bytes from the fourteenth byte are not used in those commands.

In this embodiment, each byte illustrated in FIG. 34 has a value with a sign, specifically, a value in the range from −20 dB to +20 dB at 0.5 dB intervals. As for the item having no function and the item having no change of setting, an ineffective value (e.g., "0x80") is buried in the corresponding byte before transmission.

In a case where the AV amplifier 300 notifies the television receiver 200 that the sound quality of the center speaker is +0 dB, that the sound quality of the subwoofer speaker is +1 dB, that the sound quality of the front-left speaker is −2 dB, that the sound quality of the front-right speaker is +3 dB, and that the surround speaker does not have the function, by using a command, "0x00 0x01 0x00 0x02 0xFC 0x06 0x80 0x80" are set in this order from the eighth byte, and the command is transmitted from the AV amplifier 300.

Also, in a case where the television receiver 200 notifies the AV amplifier 300 that the sound quality of the center speaker is set to +0 dB, that the sound quality of the subwoofer speaker is set to +1 dB, that the sound quality of the front-left speaker is set to −2 dB, that the sound quality of the front-right speaker is set to +3 dB, and that no setting is performed on the surround speaker because it does not have the function, by using a command, "0x00 0x02 0x00 0x02 0xFC 0x06 0x80 0x80" are set in this order from the eighth byte, and the command is transmitted from the television receiver 200.

Also, in a case where the television receiver 200 sets the sound quality of only the center speaker to +4 dB and does not change the sound quality of the other speakers (the surround speaker does not have the function and is thus not set), the television receiver 200 transmits a command in which "0x00 0x02 0x08 0x80 0x80 0x80 0x80 0x80" are set in this order from the eighth byte to the AV amplifier 300. The AV amplifier 300 receives the command from the television receiver 200 and changes the setting. After that, if the AV amplifier 300 transmits a response showing the current status to the television receiver 200, the AV amplifier 300 transmits the response by embedding the current values in the fields other than the field in which the value has been changed. By embedding an ineffective value for the item in which the setting is not changed, the necessity for holding unnecessary information in the audio device control application can be eliminated. Furthermore, information about all the settings and the current status is collectively transmitted using a single command, so that the amount of communication in the HDMI-CEC can be reduced.

In a case where the sound quality of only the center speaker is to be set to +4 dB and where the sound quality of the other speakers is not to be changed, the above-described command is transmitted from the television receiver 200. If the setting is not performed due to the condition of the receiver side (i.e., the AV amplifier 300), for example, if the speaker as a setting target is not temporarily used, an ineffective value (0x80) is set to the item in which setting is not performed, and the AV amplifier 300 transmits a command for notifying the television receiver 200 of the status.

In the examples of the data structures illustrated in FIG. 34, the value of each byte is a value with a sign. Alternatively, each byte may have a value without a sign. FIG. 35 is an explanatory view illustrating other examples of data structures of commands transmitted/received between the television receiver 200 and the AV amplifier 300.

In the examples of the data structures illustrated in FIG. 35, if the opecode defined by the sixth and seventh bytes of the command is "0x0003", the command is a command for requesting a current status from the television receiver 200 to the AV amplifier 300. If the opecode is "0x0004", the command is a command for notifying the television receiver 200 of a current status from the AV amplifier 300. If the opecode is "0x0005", the command is a setting command transmitted from the television receiver 200 to the AV amplifier 300.

Now, a description will be given of the data of each byte of the status notification command transmitted from the AV amplifier 300 to the television receiver 200 and the status setting command transmitted from the television receiver 200 to the AV amplifier 300 illustrated in FIG. 35. The eighth byte relates to a predetermined set value A, the ninth byte relates to a predetermined set value B, and the tenth byte relates to a predetermined set value C. The other bytes from the eleventh byte are not used in those commands.

In this embodiment, each byte illustrated in FIG. 35 has a value without a sign. For example, the set value A ranges from 0 to 3, the set value B ranges from 0 to 5, and the set value C ranges from 0 to 2. As for the item that does not have a function or that does not have a change in setting, an ineffective value (e.g., "0xFF") is embedded in the corresponding byte before transmission.

In a case where the AV amplifier 300 notifies the television receiver 200 that the set value A is 1, that the set value B is 3, and that no function exists for the set value C, by using a command, "0x00 0x04 0x01 0x03 0xFF" are set in this order from the eighth byte, and the command is transmitted from the AV amplifier 300.

Also, in a case where the television receiver 200 notifies the AV amplifier 300 that the set value A is set to 2, that the set value B is set to 1, and that no setting is performed on the set value C because the function does not exist, by using a command, "0x00 0x05 0x02 0x01 0xFF" are set in this order from the eighth byte, and the command is transmitted from the television receiver 200.

Also, in a case where the television receiver 200 notifies the AV amplifier 300 that only the set value B is set to 1, that the set value A is not changed, and that no setting is performed on the set value C because the function does not exist, by using a command, "0x00 0X05 0xFF 0x01 0xFF" are set in this order from the eighth byte, and the command is transmitted from the television receiver 200. In this way, by embedding an ineffective value for the item in which the setting is not changed, the necessity for holding unnecessary information in the audio device control application can be eliminated. Furthermore, information about all the settings and the current status is collectively transmitted using a single command, so that the amount of communication in the HDMI-CEC can be reduced.

In a case where only the set value B is to be set to 1 and where the other setting values are not to be changed, the above-described command is transmitted from the television receiver 200. If the setting is not performed due to the condition of the receiver side (i.e., the AV amplifier 300), for example, if the speaker as a setting target is not temporarily used, an ineffective value (0xFF) is set to the item in which setting is not performed, and the AV amplifier 300 transmits a command for notifying the television receiver 200 of the current status. Specifically, "0x00 0x04 0x02 0xFF 0xFF" are set in this order from the eighth byte, and the command is transmitted from the AV amplifier 300.

In a case where a command for performing setting beyond a predetermined range is transmitted from the television receiver 200, an ineffective value (0xFF) is set to the item in which the setting is not performed for the item, and a command for notifying the television receiver 200 of the current status is transmitted from the AV amplifier 300. For example, in a case where the television receiver 200 notifies the AV amplifier 300 that only the set value B is set to 6 (a value outside the range), that the set value A is not changed, and that the set value C is not set because the function does not exist, by using a command, "0x00 0x05 0xFF 0x06 0xFF" are set in this order from the eighth byte, and the command is transmitted from the television receiver 200. However, since the set value B ranges from 0 to 5, the setting transmitted from the television receiver 200 is not accepted. In this case, "0x00 0x04 0x02 0xFF 0xFF" are set in this order from the eighth byte, and the command is transmitted from the AV amplifier 300.

7. Conclusion

As described above, according to an embodiment of the present invention, the television receiver 200 downloads an application for controlling the setting and operation of the AV amplifier 300 from the application server 12 and performs the application. The television receiver 200 can cause the display panel 216 to display screens for controlling the setting and operation of the AV amplifier 300 by performing the application. A user operates the remote control 800 of the television receiver 200 while seeing the screen displayed on the display panel 216, thereby being able to turn off the power of the AV amplifier 300, change the audio input source, and change the setting of the sound field or the sound quality by using a command system based on the HDMI-CEC standard.

Since the operations on the AV amplifier 300 are performed using a GUI displayed on the television receiver 200, it is not necessary to provide hardware for displaying a GUI in the AV amplifier 300. Also, a high-definition user interface having a full-high-definition resolution and a rich interface using photographs can be provided to a user. Furthermore, installation of the interface is easier than installation of a GUI into the television receiver 200. Even if an application has a defect or even if the number of models of the AV amplifier 300 that can be controlled by the application increases, the defect can be overcome or the number of models can be increased by modifying the application in the application server 12, whereas it is necessary to update the firmware of the television receiver 200 in the case of incorporating a GUI into the television receiver 200.

According to the related art, it is necessary to simultaneously perform the development of the television receiver 200 and the development of the AV amplifier 300 in order to incorporate an application for controlling the AV amplifier 300 from the television receiver 200 into the television receiver 200. On the other hand, when a method for downloading an application from the application server 12 is employed as in this embodiment, the development of the application can be performed independently of the development of the television receiver 200.

If the application for controlling the AV amplifier 300 is not registered in the television receiver 200 at the time when the AV amplifier 300 is connected to the television receiver 200 via the HDMI cable 701, the television receiver 200 obtains information about the application (widget) with which the AV amplifier 300 is compatible from the AV amplifier 300, and then obtains the application (widget) from the application server 12 on the basis of the information. Accordingly, the AV amplifier 300 can be controlled from the television receiver 200 by using an appropriate application (widget) according to the AV amplifier 300 connected to the television receiver 200.

After the television receiver 200 has performed the application, the application performed by the television receiver 200 requests device model information to the AV amplifier 300. Accordingly, the application performed by the television receiver 200 can perform appropriate display and operation according to the AV amplifier 300 connected to the television receiver 200.

In the above-described embodiment, a description has been given of the case of controlling the AV amplifier 300 connected to the television receiver 200 via the HDMI cable 701 by using an application that operates in the television receiver 200, but another case is also acceptable. For example, in the configuration of the AV system 1 illustrated in FIG. 1, an embodiment of the present invention can be applied to the case of controlling the video recorders 400 and 600 and the video player 500 from the television receiver 200 by using an application that operates in the television receiver 200. Of course, a device different from the television receiver 200 may be used as a control source.

The above-described operations of the television receiver 200 and the AV amplifier 300 may be processed in a hardware manner or a software manner. A program performed by a computer may be a program in which processes are performed in time series along the order described in this specification, or may be a program in which processes are performed in parallel or at necessary timing, such as timing when a process is called.

The embodiments of the present invention have been described above with reference to the drawings, but another embodiment is also acceptable. It is obvious that those having ordinary knowledge about the field to which the present invention belongs can achieve various alterations and modifications within the scope of the technical spirit described in the claims, and those alterations and modifications belong to the technical scope of the present invention.

For example, in the above-described embodiment, the television receiver 200 downloads an application from the application server 12 as necessary and performs the downloaded application. Alternatively, the television receiver 200 may operate to delete files that are downloaded from the application server 12 and that are stored in the flash ROM 232 during execution of the application after ending the application. By deleting the files stored in the flash ROM 232, the capacity of the flash ROM 232 can be effectively used, and the latest files can be constantly downloaded from the application server 12.

It should be understood by those skilled in the art that various modifications, combinations, sub-combinations and alterations may occur depending on design requirements and other factors insofar as they are within the scope of the appended claims or the equivalents thereof.

What is claimed is:

1. A device control device, comprising:
    a transmission signal receiving/outputting unit configured to at least one of receive or output a signal containing a control signal for controlling an internal status of another device, the other device being connected to the transmission signal receiving/outputting unit;
    an application obtaining unit configured to obtain an application to be performed while controlling an operation of the other device, as necessary, by accessing an application server via a network;
    a display control unit configured to control display based on the application obtained by the application obtaining unit; and
    an operation control unit configured to control the operation of the other device by performing the application obtained by the application obtaining unit,
    wherein the display control unit changes content to be displayed in accordance with a type of the other device.

2. The device control device according to claim 1, wherein the operation control unit sets a plurality of parameters of the other device through a single transmission of a command.

3. The device control device according to claim 2, wherein the command transmitted by the operation control unit is a vendor-specific command based on HDMI-CEC.

4. The device control device according to claim 2, wherein the operation control unit sets a real number to a corresponding field of the command in the case of changing a parameter of the other device, and sets a predetermined ineffective value to the corresponding field of the command in the case of not changing the parameter.

5. The device control device according to claim 1, wherein the operation control unit turns off a power of the other device by performing the application obtained by the application obtaining unit.

6. The device control device according to claim 1, wherein the other device is an audio amplifier device, and wherein the operation control unit changes a sound field of the audio amplifier device by performing the application obtained by the application obtaining unit.

7. The device control device according to claim 1, wherein the other device is an audio amplifier device, wherein one or more speakers are connected to the audio amplifier device, and wherein the operation control unit changes an audio output level of the one or more speakers connected to the audio amplifier device by performing the application obtained by the application obtaining unit.

8. The device control device according to claim 1, wherein the other device is an audio amplifier device, and wherein the operation control unit changes an audio input source of the audio amplifier device by performing the application obtained by the application obtaining unit.

9. The device control device according to claim 1, further comprising:
    an application discarding unit configured to discard the application obtained by the application obtaining unit after the operation control unit has ended performance of the application.

10. A device control method, comprising:
    at least one of receiving or outputting a signal containing a control signal for controlling an internal status of another device;
    obtaining an application to be performed while controlling an operation of the other device, as necessary, by accessing an application server via a network;
    controlling display based on the obtained application; and
    controlling the operation of the other device by performing the obtained application,
    wherein content to be displayed is changed in accordance with a type of the other device in the controlling display.

11. A processor encoded with a computer program for carrying out a device control method, the method comprising:
    at least one of receiving or outputting a signal containing a control signal for controlling an internal status of another device;
    obtaining an application to be performed while controlling an operation of the other device, as necessary, by accessing an application server via a network;
    controlling display based on the obtained application; and
    controlling the operation of the other device by performing the obtained application, wherein content to be displayed is changed in accordance with a type of the other device in the controlling display.

12. A device control device, comprising:

transmission signal receiving/outputting means for at least one of receiving or outputting a signal containing a control signal for controlling an internal status of another device, the other device being connected to the transmission signal receiving/outputting unit;

application obtaining means for obtaining an application to be performed while controlling an operation of the other device, as necessary, by accessing an application server via a network;

display control means for controlling display based on the application obtained by the application obtaining means; and operation control means for controlling the operation of the other device by performing the application obtained by the application obtaining means, wherein the display control means changes content to be displayed in accordance with a type of the other device.

13. The device control device according to claim 1, wherein the application obtaining unit obtains the application to be performed while controlling the operation of the other device in response to an application compatible with the other device not being registered with the device control device.

14. The device control device according to claim 1, wherein the display control unit controls display of one or more of a caption and an icon based on the application obtained from the application server.

* * * * *